US010852539B2

(12) United States Patent
Yatsu et al.

(10) Patent No.: US 10,852,539 B2
(45) Date of Patent: Dec. 1, 2020

(54) PROJECTION OPTICAL SYSTEM, HEAD-UP DISPLAY DEVICE, AND VEHICLE

(71) Applicants: MAXELL, LTD., Kyoto (JP); HITACHI INDUSTRY & CONTROL SOLUTIONS, LTD., Ibaraki (JP)

(72) Inventors: Masahiko Yatsu, Ibaraki (JP); Koji Hirata, Ibaraki (JP); Shigeki Hoshino, Ibaraki (JP)

(73) Assignees: Maxell, Ltd., Kyoto (JP); Hitachi Industry & Control Solutions, Ltd., Ibaraki (JP)

( * ) Notice: Subject to any disclaimer, the term of this patent is extended or adjusted under 35 U.S.C. 154(b) by 197 days.

(21) Appl. No.: 16/300,467

(22) PCT Filed: May 20, 2016

(86) PCT No.: PCT/JP2016/065081
§ 371 (c)(1),
(2) Date: Nov. 9, 2018

(87) PCT Pub. No.: WO2017/199441
PCT Pub. Date: Nov. 23, 2017

(65) Prior Publication Data
US 2019/0179144 A1 Jun. 13, 2019

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *G02B 27/01* (2013.01);
(Continued)

(58) Field of Classification Search
CPC ................ G02B 27/0149; G02B 27/01; G02B 27/0101; B60K 35/00
(Continued)

(56) References Cited

U.S. PATENT DOCUMENTS

| 5,546,227 A | 8/1996 | Yasugaki et al. |
| 2010/0157255 A1* | 6/2010 | Togino ................. G03B 21/147 353/69 |
| 2016/0048017 A1 | 2/2016 | Kasahara et al. |

FOREIGN PATENT DOCUMENTS

| JP | 06/250113 A | 9/1994 |
| JP | 2001-208999 A | 8/2001 |
(Continued)

OTHER PUBLICATIONS

International Search Report for PCT/JP2016/065081, dated Aug. 2, 2016.

*Primary Examiner* — James R Greece
(74) *Attorney, Agent, or Firm* — Volpe Koenig

(57) ABSTRACT

A compact head-up display device is provided. For that purpose, the head-up display device includes a projection optical system which includes an image forming unit to display image information and an ocular optical system to reflect light emitted from the image forming unit to display a virtual image. In the ocular optical system, a free-form surface lens and a free-form surface concave mirror are arranged in order from the image forming unit. The shape of the free-form surface concave mirror is such that curvature radius RY1 in projection on a vertical cross section of the coordinate system of an eye-box is smaller than curvature radius RX1 in projection on a horizontal cross section.

17 Claims, 25 Drawing Sheets

(52) U.S. Cl.
CPC .... *G02B 27/0101* (2013.01); *B60K 2370/334* (2019.05); *G02B 2027/015* (2013.01)

(58) Field of Classification Search
USPC .......................................................... 359/631
See application file for complete search history.

(56) References Cited

FOREIGN PATENT DOCUMENTS

| | | |
|---|---|---|
| JP | 2004-101829 A | 4/2004 |
| JP | 2009-229552 A | 10/2009 |
| JP | 2010-164944 A | 7/2010 |
| JP | 2014-191143 A | 10/2014 |
| JP | 2015-194707 A | 11/2015 |

\* cited by examiner

FIG. 3

| NAME | PLANE NO. | SHAPE | CURVATURE RADIUS | INTER-PLANE DISTANCE | GLASS MATERIAL NAME | DECENTERING /TURN | DECENTERING(mm) X AXIS | Y AXIS | Z AXIS | TURN (DEGREES) AROUND X AXIS | AROUND Y AXIS | AROUND Z AXIS |
|---|---|---|---|---|---|---|---|---|---|---|---|---|
| OBJECT PLANE VIRTUAL IMAGE PLANE | PLANE 0 | FLAT SURFACE | ∞ | 2000 | | | 0 | 0 | 0 | 0 | 0 | 0 |
| ENTRANCE PUPIL | PLANE 1 | FLAT SURFACE | ∞ | −784.68 | | ORDINARY DECENTERING | 0 | 0 | 0 | −5.08 | 0 | 0 |
| MIRROR M1 | PLANE 2 | FREE-FORM SURFACE | ∞ | 0 | REFLECTION | DECENTERING & RETURN | 380 | −0.1 | −46.3 | 0 | 0 | 0 |
| DUMMY PLANE | PLANE 3 | FLAT SURFACE | ∞ | 358.031 | | ORDINARY DECENTERING | 0 | 0 | 0 | −145.213 | 6.013 | 0 |
| MIRROR M2 | PLANE 4 | FREE-FORM SURFACE | −411.356 | 0 | REFLECTION | DECENTERING & RETURN | 0 | 0 | 0 | −23.020 | 13.448 | 43.578 |
| DUMMY PLANE | PLANE 5 | FLAT SURFACE | ∞ | −121.330 | | ORDINARY DECENTERING | 0 | 0 | 0 | −32.726 | 22.671 | 0 |
| FREE-FORM SURFACE LENS | PLANE 6 | FREE-FORM SURFACE | ∞ | −5 | MPCD4_HOYA | ORDINARY DECENTERING | 0 | 0 | 0 | 31.191 | −25.774 | −14.251 |
| | PLANE 7 | FREE-FORM SURFACE | ∞ | −12.740 | | | 0 | 0 | 0 | 0.000 | 0.000 | 10.237 |
| POLARIZING PLATE | PLANE 8 | FLAT SURFACE | ∞ | −0.122 | 50.30 | ORDINARY DECENTERING | 0.796 | −2.830 | 0 | −2.340 | −0.363 | 0 |
| | PLANE 9 | FLAT SURFACE | ∞ | 0.000 | | | 0 | 0 | 0 | 0 | 0 | 0 |
| COVER GLASS | PLANE 10 | FLAT SURFACE | ∞ | −0.6 | 52.60 | | 0 | 0 | 0 | 0.000 | 0.000 | 0.000 |
| | PLANE 11 | FLAT SURFACE | ∞ | 0 | | | 0 | 0 | 0 | 0 | 0 | 0 |
| IMAGE PLANE LCD | PLANE 12 | FLAT SURFACE | ∞ | 0 | | | 0 | 0 | 0 | 0 | 0 | 0 |

FIG. 4

| CODE | | MIRROR SURFACE (2) | MIRROR SURFACE (4) | LENS SURFACE (6) | LENS SURFACE (7) |
|---|---|---|---|---|---|
| R | $1/c$ | ∞ | -411.356 | ∞ | ∞ |
| K | K | 0.00000 | 0.49008 | | |
| C2 | $X$ | | -3.47837E-01 | 6.44151E-02 | 3.25369E-03 |
| C3 | $Y$ | 1.92070E+00 | -1.07623E-01 | -1.49973E-01 | 2.05829E-02 |
| C4 | $X^2$ | 2.83990E-04 | -6.75914E-04 | -1.79872E-03 | -1.61261E-02 |
| C5 | $XY$ | | -6.24836E-05 | -1.24009E-02 | -1.21908E-02 |
| C6 | $Y^2$ | 7.81820E-04 | -6.62423E-04 | 2.85052E-02 | 1.18632E-02 |
| C7 | $X^3$ | | -3.39361E-06 | -1.76706E-05 | -1.00162E-05 |
| C8 | $X^2Y$ | 5.33890E-07 | 3.57870E-06 | 3.16602E-05 | 1.27511E-04 |
| C9 | $XY^2$ | | -5.51570E-07 | 6.17229E-05 | -1.15519E-04 |
| C10 | $Y^3$ | 1.44540E-07 | -1.61113E-07 | 4.19653E-04 | 8.65250E-04 |
| C11 | $X^4$ | 3.12850E-10 | -1.15981E-08 | -4.58613E-06 | -2.56701E-06 |
| C12 | $X^3Y$ | | -1.64942E-08 | 3.28663E-06 | -3.97958E-06 |
| C13 | $X^2Y^2$ | 1.29950E-10 | -4.32700E-08 | -3.92225E-05 | -6.86772E-06 |
| C14 | $XY^3$ | | -1.20404E-08 | 3.08209E-05 | 2.31208E-05 |
| C15 | $Y^4$ | -5.24300E-09 | -3.08461E-09 | -2.79950E-05 | 1.02974E-05 |
| C16 | $X^5$ | | -5.45321E-11 | 4.74443E-08 | -2.19416E-07 |
| C17 | $X^4Y$ | -6.35040E-13 | -2.23431E-10 | -2.06569E-07 | 2.40048E-07 |
| C18 | $X^3Y^2$ | | -1.39688E-10 | -2.87100E-07 | -5.92876E-07 |
| C19 | $X^2Y^3$ | 4.24900E-12 | -8.46957E-11 | -1.56020E-07 | -1.22508E-06 |
| C20 | $XY^4$ | | 7.12726E-12 | -3.35383E-07 | 1.20047E-06 |
| C21 | $Y^5$ | -1.63760E-13 | -6.19277E-12 | -1.61547E-07 | -2.11215E-06 |
| C22 | $X^6$ | -6.21710E-16 | 3.01556E-14 | 7.76816E-10 | -1.84851E-08 |
| C23 | $X^5Y$ | | 3.11794E-12 | 8.41607E-10 | -5.24588E-08 |
| C24 | $X^4Y^2$ | 5.30230E-16 | 4.27429E-12 | 4.46177E-10 | -7.48849E-08 |
| C25 | $X^3Y^3$ | | 4.43189E-12 | -1.65101E-08 | -1.71260E-08 |
| C26 | $X^2Y^4$ | 8.86800E-14 | 2.24910E-12 | -8.64659E-09 | -4.61582E-09 |
| C27 | $XY^5$ | | 1.13184E-12 | -3.14009E-08 | -1.50893E-07 |
| C28 | $Y^6$ | 1.22860E-13 | 4.25753E-13 | 1.65603E-08 | -7.14183E-08 |
| C29 | $X^7$ | | 7.53109E-17 | 1.53886E-11 | 3.32510E-10 |
| C30 | $X^6Y$ | 3.80480E-18 | -9.15138E-18 | 6.02638E-11 | -2.98427E-09 |
| C31 | $X^5Y^2$ | | 1.20734E-15 | 4.24676E-10 | 1.56368E-08 |
| C32 | $X^4Y^3$ | -5.15920E-18 | -8.11467E-17 | -9.27379E-10 | -4.66892E-09 |
| C33 | $X^3Y^4$ | | 2.57537E-15 | 2.41049E-09 | -9.09777E-09 |
| C34 | $X^2Y^5$ | 1.25060E-16 | 1.12596E-15 | -2.91497E-09 | 1.23055E-08 |
| C35 | $XY^6$ | | -7.12608E-18 | 5.57495E-10 | -4.55492E-09 |
| C36 | $Y^7$ | -3.47380E-16 | 2.37217E-16 | -1.02328E-09 | -4.37386E-09 |
| C37 | $X^8$ | 1.41220E-21 | -1.07275E-18 | -3.35662E-13 | 1.08886E-11 |
| C38 | $X^7Y$ | | -9.53657E-20 | -2.80368E-12 | 1.20515E-10 |
| C39 | $X^6Y^2$ | 1.60140E-20 | -9.53118E-20 | 1.06632E-11 | -1.94568E-10 |
| C40 | $X^5Y^3$ | | 7.01893E-18 | 1.89858E-11 | 9.20169E-10 |
| C41 | $X^4Y^4$ | -4.78450E-19 | 8.50516E-18 | -2.02553E-11 | 1.77343E-10 |
| C42 | $X^3Y^5$ | | -3.87370E-18 | 1.52851E-11 | -6.48402E-10 |
| C43 | $X^2Y^6$ | -2.07340E-18 | 1.01918E-17 | 1.12714E-10 | 2.07447E-10 |
| C44 | $XY^7$ | | 1.75802E-17 | -1.13799E-10 | 1.75887E-10 |
| C45 | $Y^8$ | -2.16160E-18 | -1.83103E-18 | -5.96462E-12 | -7.70169E-11 |
| C46 | $X^9$ | | -1.84302E-20 | -1.63383E-14 | 1.08564E-13 |
| C47 | $X^8Y$ | -4.78040E-24 | -5.04191E-21 | -3.38144E-14 | 2.31725E-12 |
| C48 | $X^7Y^2$ | | 4.47422E-21 | 5.0341E-13 | -2.76698E-11 |
| C49 | $X^6Y^3$ | -4.24990E-23 | 1.04111E-20 | -2.60755E-12 | 5.77112E-11 |
| C50 | $X^5Y^4$ | | -2.81567E-19 | 3.71287E-12 | -1.29428E-10 |
| C51 | $X^4Y^5$ | -2.97720E-21 | 4.11028E-21 | 8.3176E-13 | 2.26681E-11 |
| C52 | $X^3Y^6$ | | 1.29903E-19 | 7.87606E-14 | 6.10328E-11 |
| C53 | $X^2Y^7$ | -5.12040E-21 | 1.99125E-19 | -5.07228E-12 | 1.89001E-11 |
| C54 | $XY^8$ | | -1.61299E-20 | 2.38231E-12 | -4.26378E-12 |
| C55 | $Y^9$ | 1.88170E-20 | -5.58933E-21 | -3.39566E-12 | 5.45689E-12 |
| C56 | $X^{10}$ | -1.39350E-27 | -1.60685E-22 | 3.34137E-16 | 8.86398E-15 |
| C57 | $X^9Y$ | | -1.41829E-22 | 5.10301E-16 | 5.07108E-14 |
| C58 | $X^8Y^2$ | -3.39430E-26 | 1.75547E-22 | -1.64654E-14 | 6.05054E-13 |
| C59 | $X^7Y^3$ | | 5.80508E-23 | 5.94245E-14 | -3.08691E-12 |
| C60 | $X^6Y^4$ | -5.30780E-26 | -8.26102E-23 | -1.46481E-13 | 4.09082E-12 |
| C61 | $X^5Y^5$ | | 3.80188E-21 | 8.37901E-14 | -7.09752E-12 |
| C62 | $X^4Y^6$ | -6.10680E-24 | 1.75737E-21 | 8.64788E-14 | 4.02438E-13 |
| C63 | $X^3Y^7$ | | -1.15368E-21 | -2.81688E-14 | 3.50699E-12 |
| C64 | $X^2Y^8$ | 1.02510E-23 | 1.33485E-22 | 2.23011E-15 | 1.94979E-12 |
| C65 | $XY^9$ | | -1.195E-22 | -2.89622E-13 | -4.79931E-13 |
| C66 | $Y^{10}$ | 7.15920E-23 | 7.41941E-23 | 5.85804E-14 | 1.12295E-23 |

FIG. 10
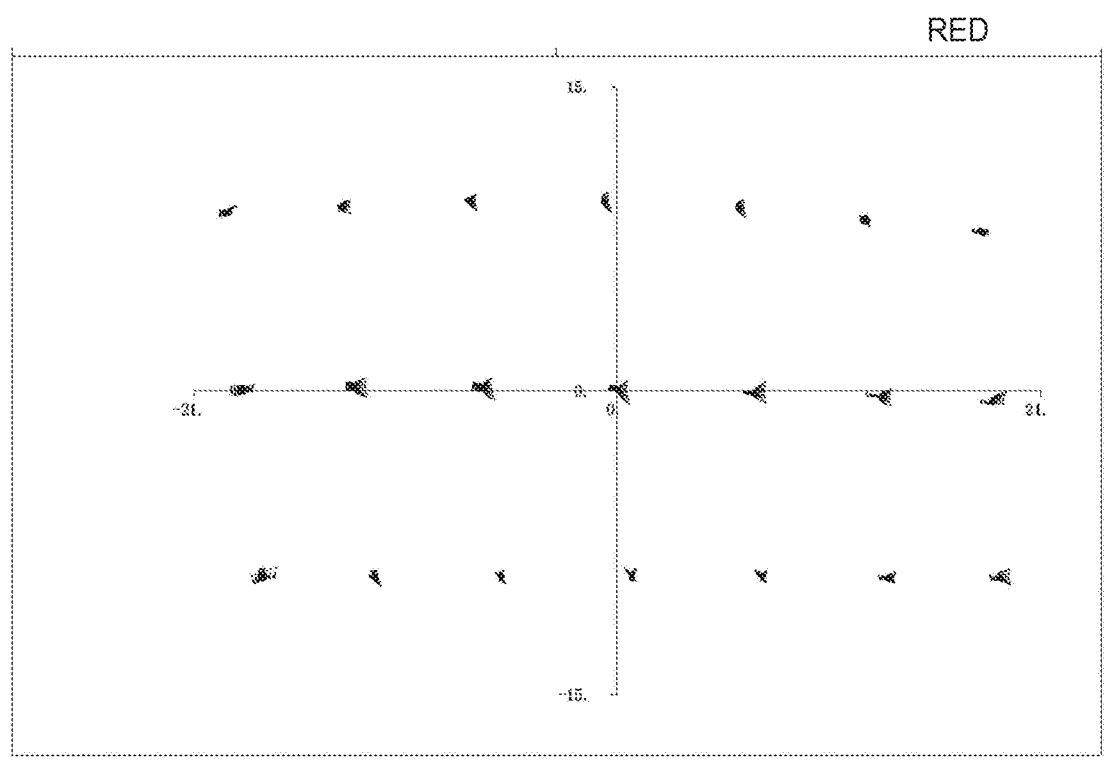
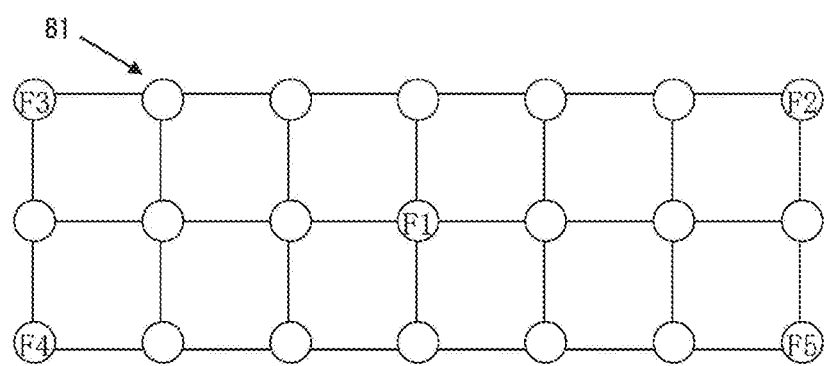

FIG. 11
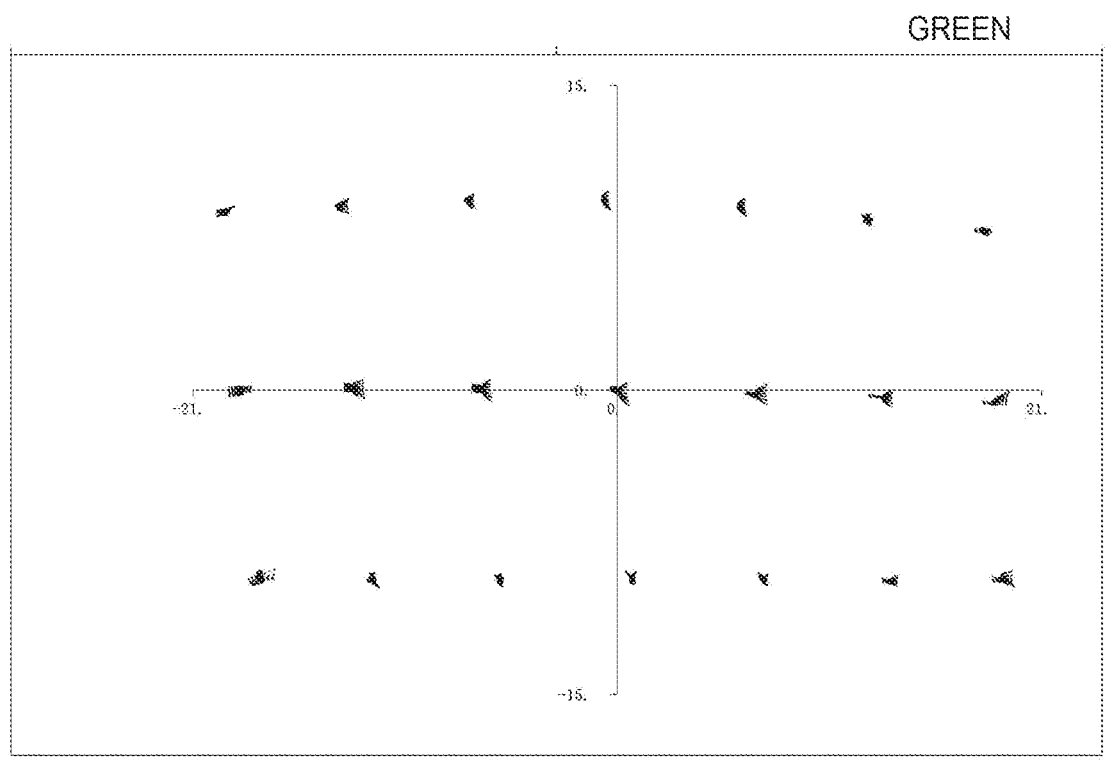
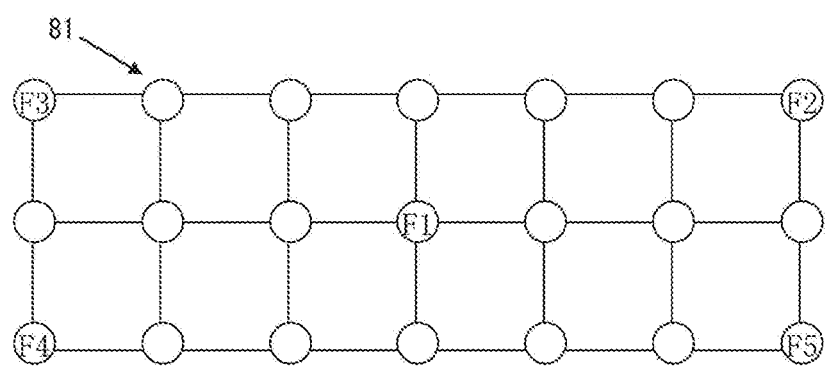

FIG. 12
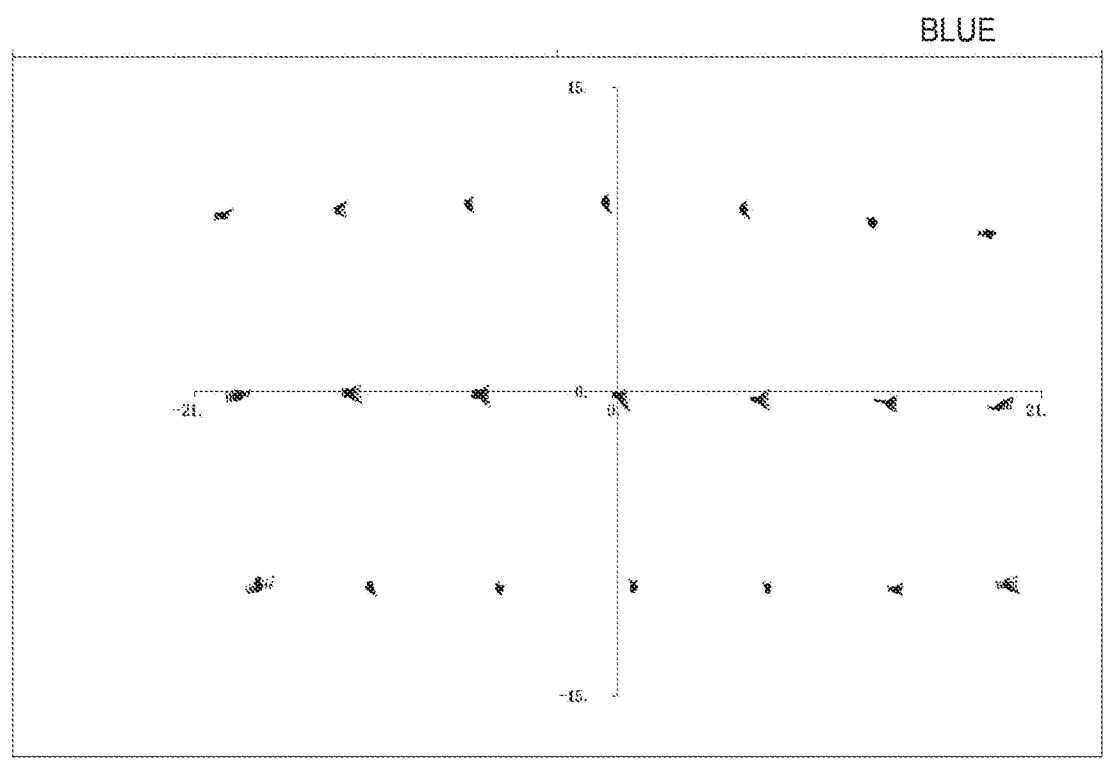
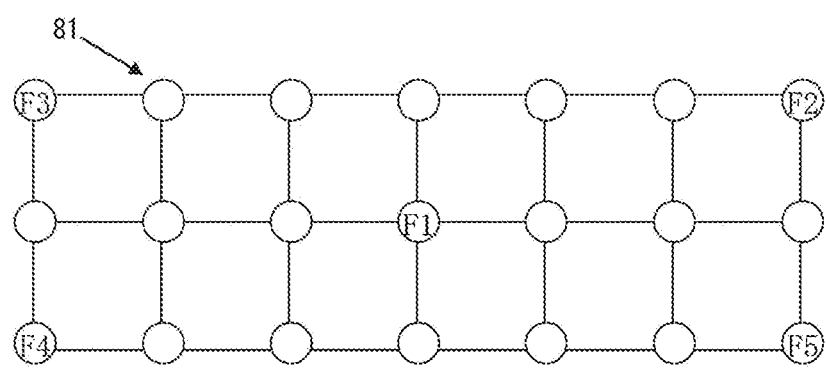

| 6673 | 6666 | 6645 | 6611 | 6564 | 6507 | 6441 |
|------|------|------|------|------|------|------|
| 6635 | 6638 | 6628 | 6606 | 6572 | 6528 | 6477 |
| 6669 | 6688 | 6691 | 6679 | 6653 | 6617 | 6575 |

| 1119 | 1131 | 1143 | 1157 | 1171 | 1188 | 1206 |
|------|------|------|------|------|------|------|
| 1097 | 1107 | 1118 | 1131 | 1145 | 1162 | 1181 |
| 1074 | 1082 | 1092 | 1105 | 1119 | 1137 | 1159 |

FIG. 15C $\Delta$ REFRACTION POWER (%)

| 1% | 0% | −1% | −2% | −3% | −4% | −5% |
|----|----|-----|-----|-----|-----|-----|
| 3% | 2% | 1%  | 0%  | −1% | −2% | −3% |
| 4% | 4% | 3%  | 2%  | 1%  | 0%  | −2% |

| 349 | 320 | 295 | 274 | 255 | 240 | 229 |
|-----|-----|-----|-----|-----|-----|-----|
| 333 | 313 | 296 | 282 | 269 | 258 | 250 |
| 326 | 311 | 298 | 287 | 278 | 271 | 265 |

| 406 | 391 | 378 | 368 | 362 | 360 | 358 |
|-----|-----|-----|-----|-----|-----|-----|
| 397 | 381 | 368 | 358 | 351 | 347 | 345 |
| 394 | 378 | 363 | 352 | 344 | 340 | 338 |

FIG. 17C

Δ REFRACTION POWER (%)

| -16% | -10% | -5% | 0% | 5% | 10% | 13% |
|------|------|-----|----|----|-----|-----|
| -13% | -8%  | -4% | 0% | 4% | 7%  | 9%  |
| -12% | -8%  | -4% | 0% | 3% | 5%  | 6%  |

PROJECTION OPTICAL SYSTEM, HEAD-UP DISPLAY DEVICE, AND VEHICLE

TECHNICAL FIELD

The present invention relates to a projection optical system and a head-up display device which uses the same.

BACKGROUND ART

A head-up display device which projects an image on a windshield provided in a movable body such as a vehicle or aircraft and enables the projected image to be viewed through the windshield as a virtual image is known.

As an existing head-up display device, a device "with a projection optical system which radiates light on the back of a transmission type liquid crystal display panel and enlarges and projects the image displayed on the liquid crystal display panel" is known (for example, see Patent Literature 1).

In the head-up display device disclosed in Patent Literature 1, its projection optical system includes a relay lens and a projection lens (ocular optical system). The relay lens is structured to use telecentric display light efficiently by satisfying several conditions, and enlarges the image displayed on the liquid crystal display panel to form a real image. The projection lens further enlarges the real image and projects the image on the windshield of a vehicle or the like to display a virtual image for a driver.

The head-up display device in Patent Literature 1 displays the values on various instruments such as a speed meter, tachometer, water temperature meter, and fuel gauge as a virtual image, 2 meters ahead of the viewer (driver). Since the difference between the visual line direction in which the values on the instruments are viewed as a virtual image and the visual line direction in which the driver views the foreground is small, the time required to move the visual line between the two visual line directions can be decreased.

Furthermore, the distance to the virtual image (about 2 meters ahead) is closer to the distance to the foreground viewed by the driver than the distance to view the various instruments, etc. directly. This also decreases the time required to bring the eyes into focus between a state in which the eyes are focused on an object in the foreground and a state in which the eyes are focused on the virtual image.

Because of these two advantages, the use of the head-up display device is expected to improve safety in driving a vehicle, etc.

Also, as another existing head-up display device, a "display device in which a rotationally asymmetric mirror and a free-form surface mirror are arranged in order from the display device side and the positional angle of each mirror is prescribed" is known (for example, see Patent Literature 2).

CITATION LIST

Patent Literature

PATENT LITERATURE 1: Japanese Patent Application Laid-Open No. 2009-229552
PATENT LITERATURE 2: Japanese Patent Application Laid-Open No. 2015-194707

SUMMARY OF INVENTION

Technical Problem

If an arrangement is made as in the head-up display device disclosed in Patent Literature 2, namely an arrangement is made so that the display device and rotationally asymmetric mirror are out of alignment in the horizontal direction, the head-up display device can be low-profile.

However, in the head-up display device disclosed in Patent Literature 2, the virtual image size is horizontally long. In the case of Example 1, the horizontal size of the virtual image is twice as large as its vertical size (for example, see Example 1 in Patent Literature 2). In the structure which displays such a horizontally long virtual image, its optical path must be structured to deflect a horizontal luminous flux which is twice as large as a vertical luminous flux. In order to deflect a large luminous flux, the size of the deflecting mirror must be large.

Therefore, the structure disclosed in Patent Literature 2 has a problem that the volume of the entire head-up display device must be decreased.

The present invention has been made in view of the above circumstances and has an object to provide a projection optical system which can be structured with a smaller number of optical elements and a compact head-up display device which uses the same.

Solution to Problem

In order to solve the above problem, there is provided a projection optical system which includes an ocular optical system to reflect light emitted from an image forming unit for generating image information and project the light on a windshield to display a virtual image, in which the ocular optical system includes a free-form surface lens and a free-form surface concave mirror in order from the image forming unit, and if a horizontal direction of an eye-box is defined as X axis, a vertical axis is defined as Y axis, and a direction perpendicular to an XY plane is defined as Z axis, when as for a luminous flux corresponding to a view-point as an arbitrary point in a field of view, a curvature radius (positive value) of a circle determined by three points as projections on a YZ plane of intersections of three light rays passing through two points, an upper and a lower point, and a center point on the Y axis of the eye-box on the free-form surface concave mirror is expressed as RYA and a curvature radius (positive value) of a circle determined by three points as projections on an XZ plane of intersections of three light rays passing through two points, a left and a right point, and a center point on the X axis of the eye-box on the free-form surface concave mirror is expressed as RX4, RX4>RY4 is satisfied.

Advantageous Effects of Invention

According to the present invention, a projection optical system which can be structured with a smaller number of optical elements and a compact head-up display device which use the same can be provided.

BRIEF DESCRIPTION OF DRAWINGS

FIG. 1 is an overall light ray view of the projection optical system according to the present invention, in which

FIG. 3 shows lens data for the ocular optical system according to the first embodiment.

FIG. 4 shows free-form surface coefficients for the ocular optical system according to the first embodiment.

FIG. 10 is a red spot view of the ocular optical system according to the first embodiment.

FIG. 11 is a green spot view of the ocular optical system according to the first embodiment.

FIG. 12 is a blue spot view of the ocular optical system according to the first embodiment.

FIGS. 15A-15C show an example of a local curvature radius of the windshield according to the first embodiment.

FIGS. 17A-17C show an example of a local curvature radius of the free-form surface concave mirror according to the first embodiment.

DESCRIPTION OF EMBODIMENTS

Next, an embodiment of the present invention and various examples will be described referring to drawings, etc. The description below shows concrete examples of the content of the present invention and the present invention is not limited to what is described herein and various changes and modifications may be made by those skilled in the art within the scope of the technical idea disclosed in this description. In all the drawings that explain the present invention, elements with the same functions are designated by the same reference signs and repeated description thereof may be omitted.

Figure 19:
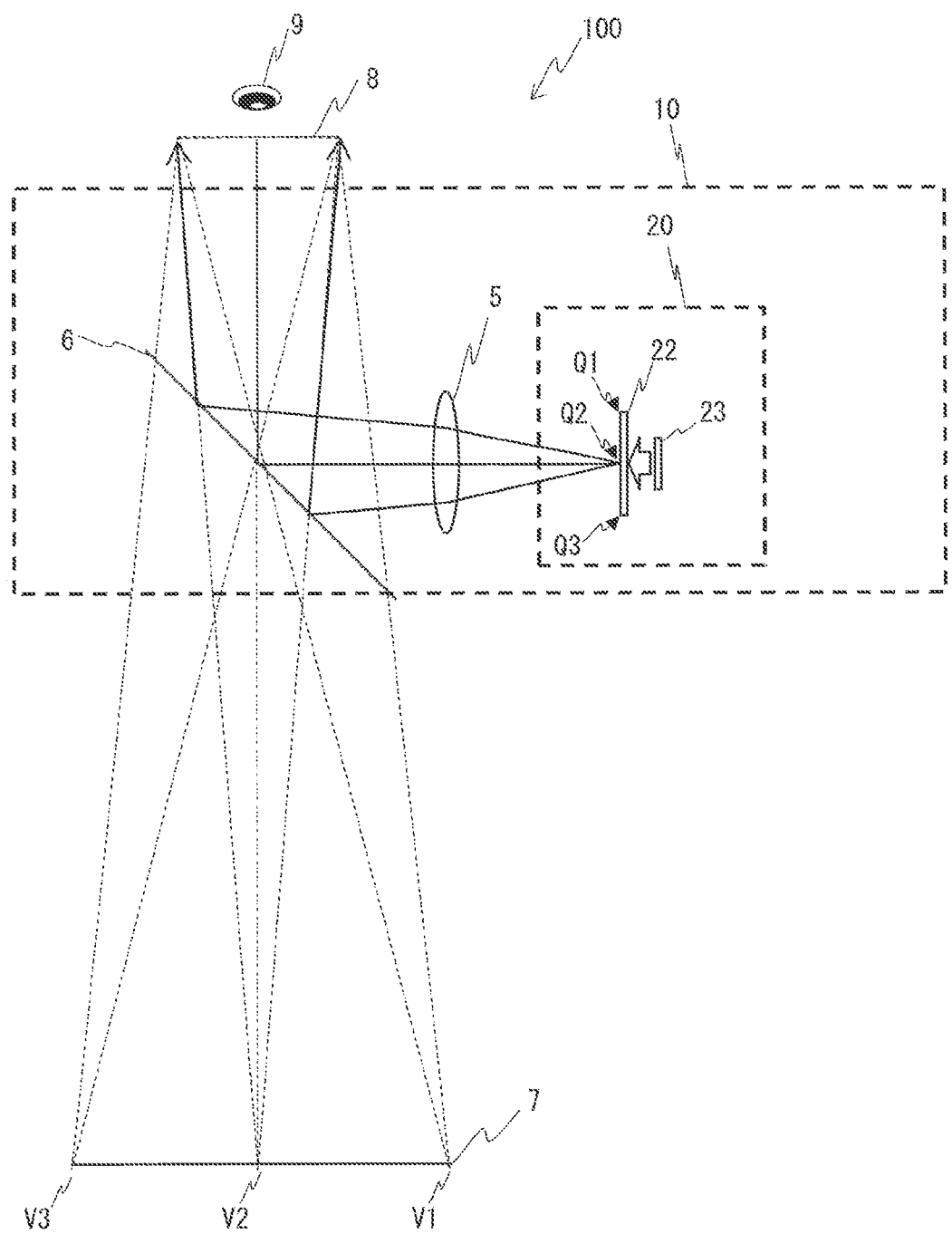
FIG. 19 is a general structure diagram which shows the head-up display device according to the first embodiment of the present invention.

First, an embodiment of the head-up display device according to the present invention will be described referring to FIG. 19. FIG. 19 is a general structure diagram which illustrates the basic structure of an HUD (Head-UP Display) 100 according to this embodiment. The HUD 100 is structured to make a windshield 6 reflect image light emitted from a projection optical system 10 including an image forming unit 20 and an ocular optical system 5 so that the light enters an eye 9 of a viewer. Due to this structure, when seen from the eye 9 of the viewer, it looks like that image information is viewed on a virtual image plane 7.

Figure 25:
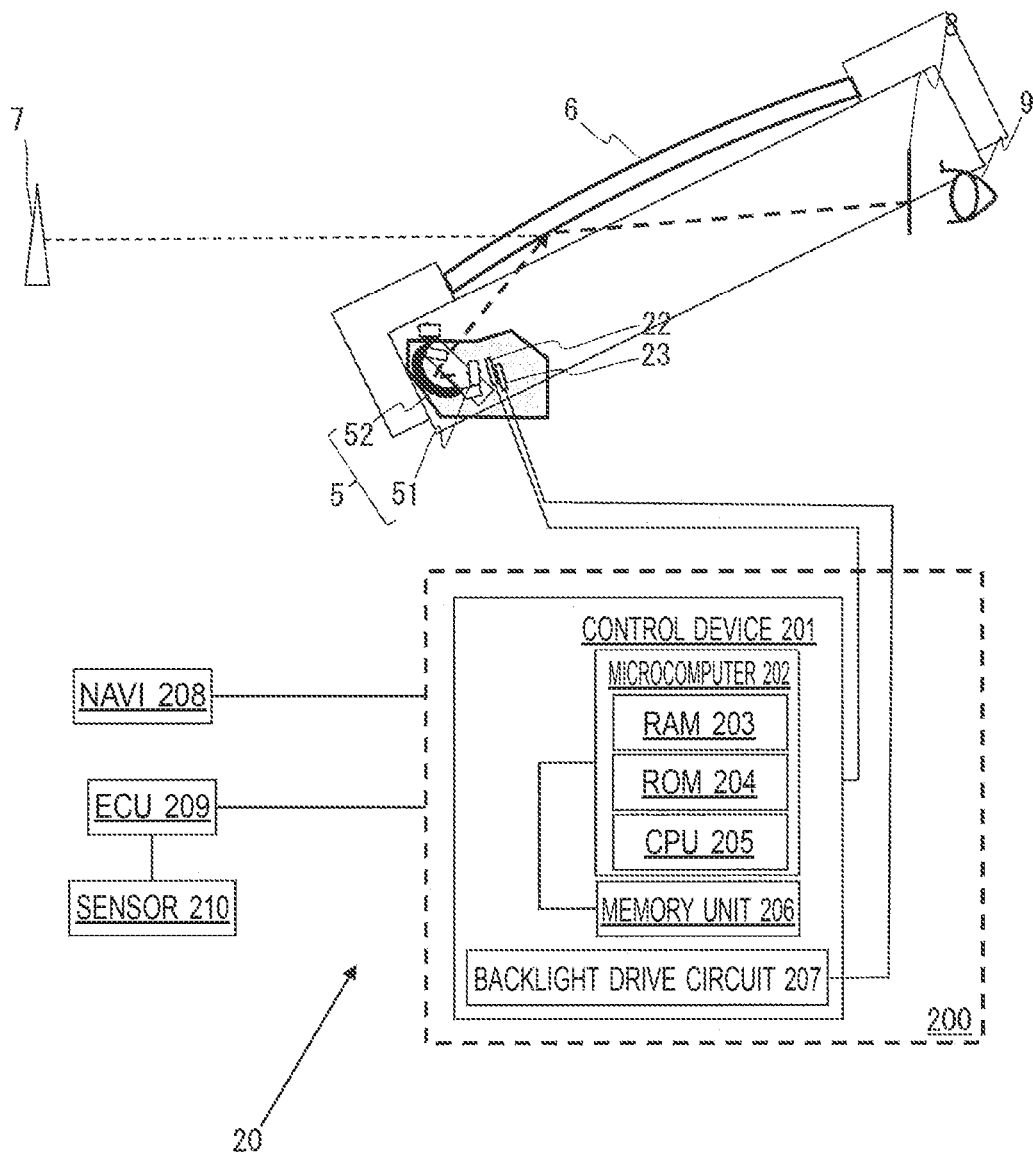
FIG. 25 is a view which explains the structure of the image forming unit of the projection optical system according to the present invention.

First, the image forming unit 20 is described below. As shown in FIG. 25, the image forming unit 20 includes a liquid crystal display panel 22, a backlight 23, and a controller 200 which controls operation of these. The image forming unit 20 irradiates the liquid crystal display panel 22 with light from the backlight 23 and emits the image information (visual information) displayed on the liquid crystal display panel 22 toward the ocular optical system 5.

The controller 200 includes a control device 201. This control device 201 receives various kinds of information from an external device. For example, it is connected to a navi 208 as a navigation device which generates and outputs information concerning operation of the mobile body in which the HUD 100 is mounted, and an ECU (Electronic Control Unit) 209 which controls operation of the mobile body. The ECU 209 is connected to various sensors 210 provided in the mobile body so as to notify the ECU 209 of detected information.

The controller 200 includes the control device 201 which processes various data from the external device as described above and a backlight drive circuit 207 to drive the backlight 23.

The control device 201 includes: a RAM (Random Access Memory) 203 to store various data from the external device; a CPU (Central Processing Unit) 205 which performs arithmetic processing to generate image data as the base for a virtual image to be visually recognized by the viewer; and a ROM (Read Only Memory) 204 which stores a program to enable arithmetic processing by the CPU 205 and parameters.

The controller 200 thus structured enables the image information to be displayed on the liquid crystal display panel 22 of the image forming unit 20. The image forming unit 20 emits the image information displayed on the liquid crystal display panel 22 as an image luminous flux through a luminous flux radiated from the backlight 23.

Refer to FIG. 19 again. The image luminous flux generated and emitted by the image forming unit 20 is projected on the windshield 6 by the ocular optical system 5. The image luminous flux projected on the windshield 6 is reflected by the windshield 6 to reach the eye 9 of the viewer. This establishes a relation that when seen from the eye 9 of the viewer, it looks like that the image information on the virtual image plane 7 is being viewed.

As shown in FIG. 19, points Q1, Q2, and Q3 on the image luminous flux emitting surface of the liquid crystal display panel 22 are assumed as virtual points. When virtual points on the virtual image plane 7 which correspond to an image luminous flux emitted from these virtual points are considered, they are points V1, V2, and V3 as shown in FIG. 19.

The range in which the points V1, V2, and V3 on the virtual image plane 7 can be visually recognized even when the viewer moves the eye 9 is an eye-box 8.

FIG. 19 is a plane view of the HUD 100. The actual structure of the HUD 100 is stereoscopic and the eye-box 8 extends two-dimensionally. Thus, the ocular optical system 5 is an optical system which shows the image (virtual image) of an object (aerial image) in front of the eyes of the viewer, like the eyepiece lens of a camera finder and the eyepiece lens of a microscope.

Figure 24:
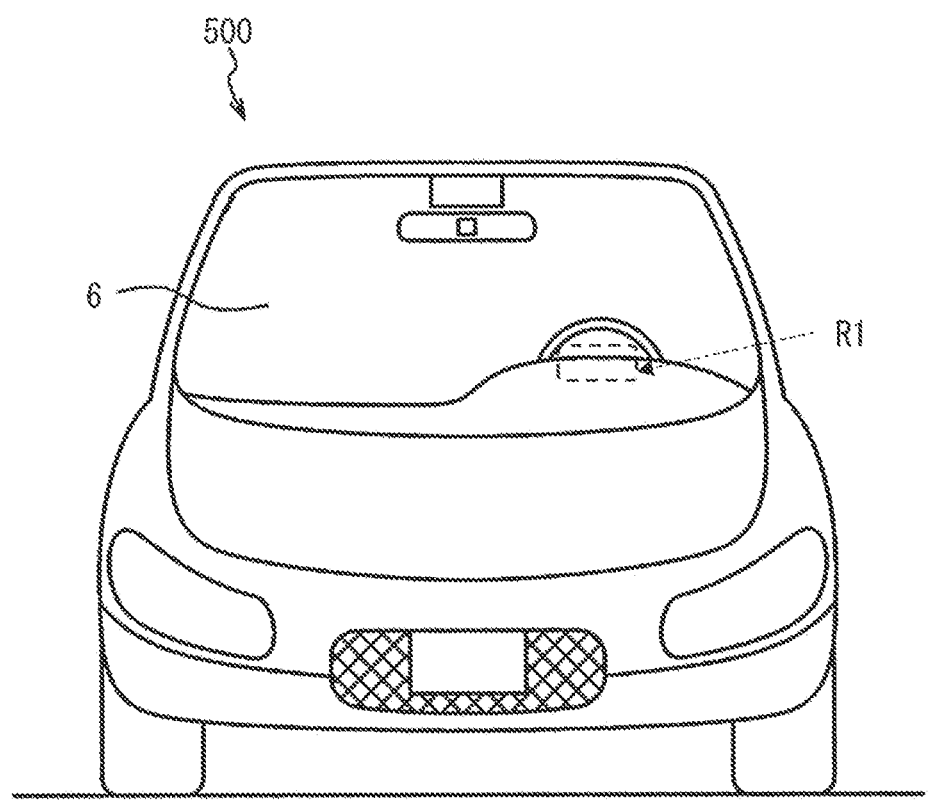
FIG. 24 is a plane view which shows an embodiment of a vehicle according to the present invention.

Here, an example in which the HUD 100 according to this embodiment is mounted in a mobile body will be explained referring to FIG. 24. FIG. 24 is a plane view of a vehicle 500 as a mobile body as seen from ahead of it. In the vehicle 500 as shown in FIG. 24, the windshield 6 as a front glass for protection against wind is located in front of the driver seat.

The HUD 100 projects an image luminous flux on the windshield 6 so that the viewer on the driver seat can visually recognize many kinds of information related to operation of the vehicle 500 as a virtual image. The position in which the image luminous flux is projected is ahead of or around the driver seat. For example, the image luminous flux is projected in a position indicated by broken line rectangular region R1 in FIG. 24.

Next, the local curvature radii of the free-form surface concave mirror 52 included in the projection optical system 10 of the HUD 100 and the windshield 6 will be explained.

FIG. 13 is a light ray view which shows the optical path from the eye-box 8 to the free-form surface concave mirror 52 in the coordinate system of the eye-box 8. The coordinate system of the eye-box 8 is a three-dimensional orthogonal coordinate system. As shown in FIG. 13, the horizontal direction of the eye-box 8 is defined as X axis, the vertical direction is defined as Y axis and the axis orthogonal to the X axis and Y axis and perpendicular to the XY plane is defined as Z axis.

Figure 13A:
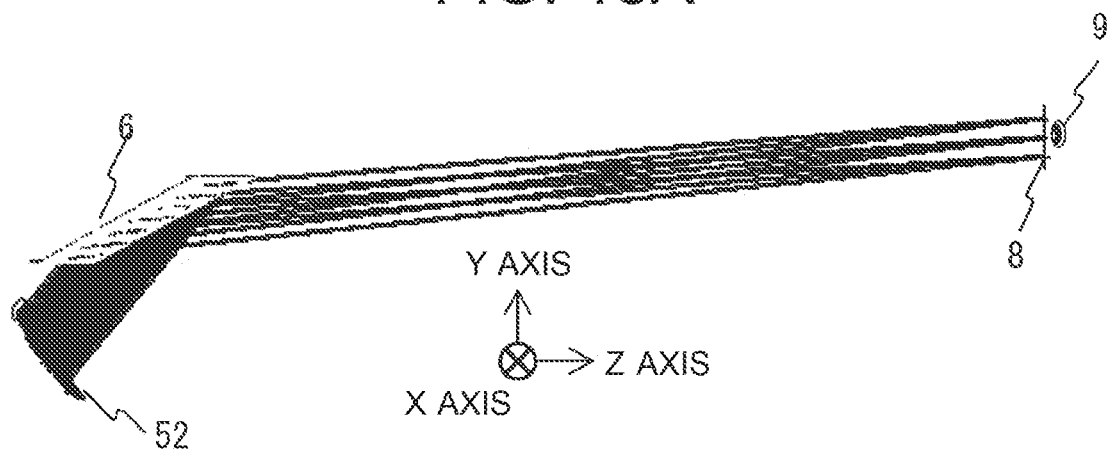
FIGS. 13A and 13B are a view which explains asymmetry of the windshield according to the first embodiment.
Figure 13B:
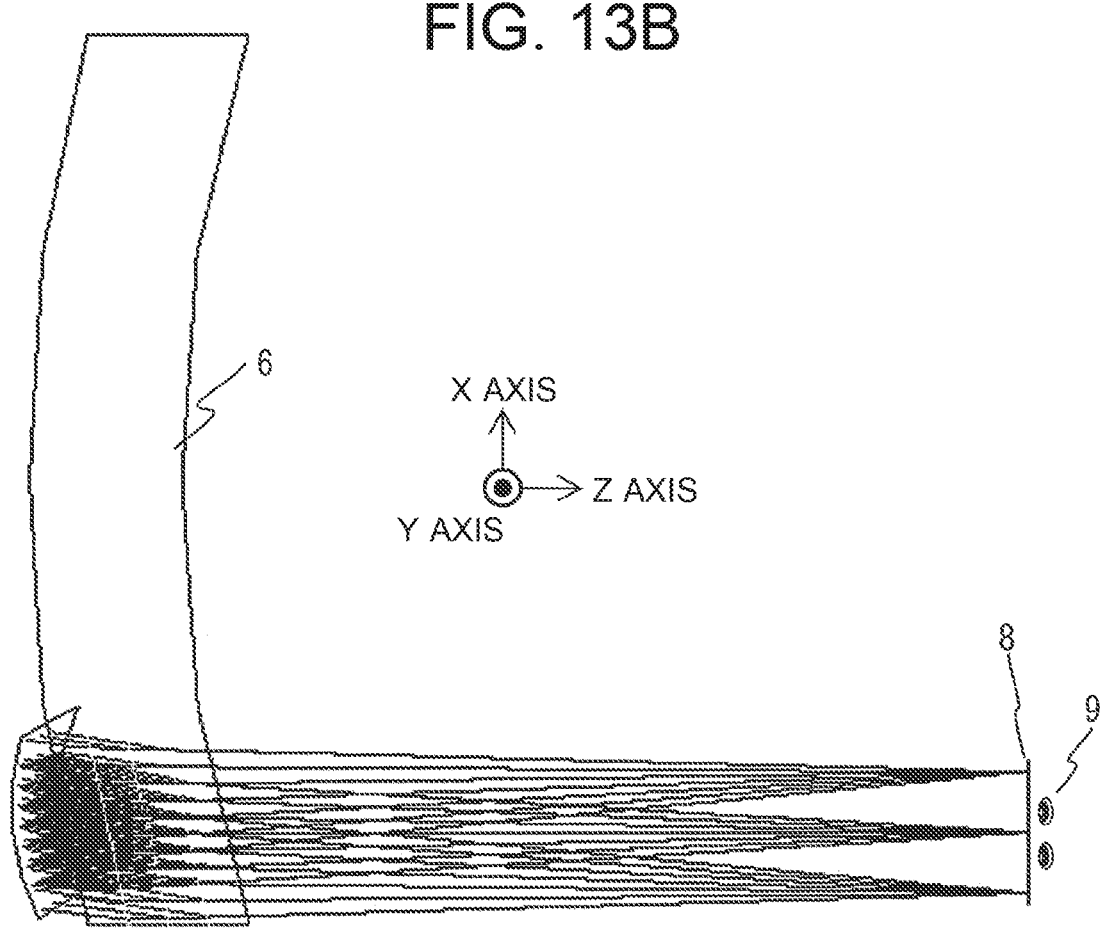

FIG. 13(a) is a view which illustrates the relative positional relation among the windshield 6, free-form surface concave mirror 52, and eye-box 8 on the YZ plane. FIG. 13(b) is a view which illustrates the relative positional relation among the windshield 6, free-form surface concave mirror 52, and eye-box 8 on the XZ plane.

The vehicle 500 used in the description of this embodiment is a left hand drive car (see FIG. 24). Therefore, the driver seat is on the left hand side as seen in the forward direction of the vehicle 500 and the position of projection of the image luminous flux on the windshield 6 is on the left side. If the vehicle 500 is a right hand drive car, the position of projection of the image luminous flux on the windshield 6 is on the right hand side as seen in the forward direction of the vehicle 500.

The shape of the windshield 6 is bilaterally symmetric with respect to the vehicle 500 as shown in FIG. 24. The driver as the viewer faces the windshield 6 while in a position on the left side in the vehicle 500. Therefore, when seen from the viewer, the shape of the windshield 6 is bilaterally asymmetric. Also, the shape of the windshield 6 is vertically asymmetric as shown in FIG. 13(a). In terms of the reflex action of the windshield 6, the shape of the windshield 6 as seen from the driver as the viewer is asymmetric both bilaterally and vertically as mentioned above. Therefore, the image luminous flux projected on the windshield 6 is affected by this asymmetry. In other words, the windshield 6 does not have an optimum shape as the shape to project and reflect an image luminous flux as in the HUD 100.

Figure 14A:
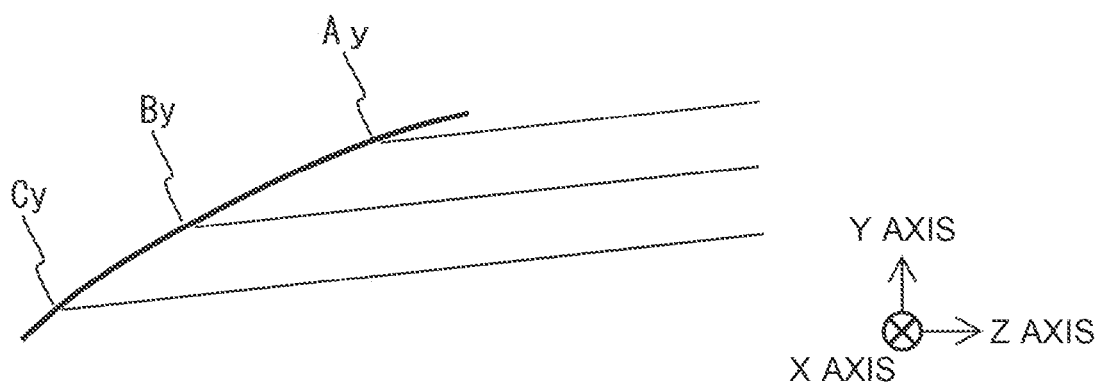
FIGS. 14A and 14B are a view which explains a local curvature radius of the windshield according to the first embodiment.
Figure 14B:
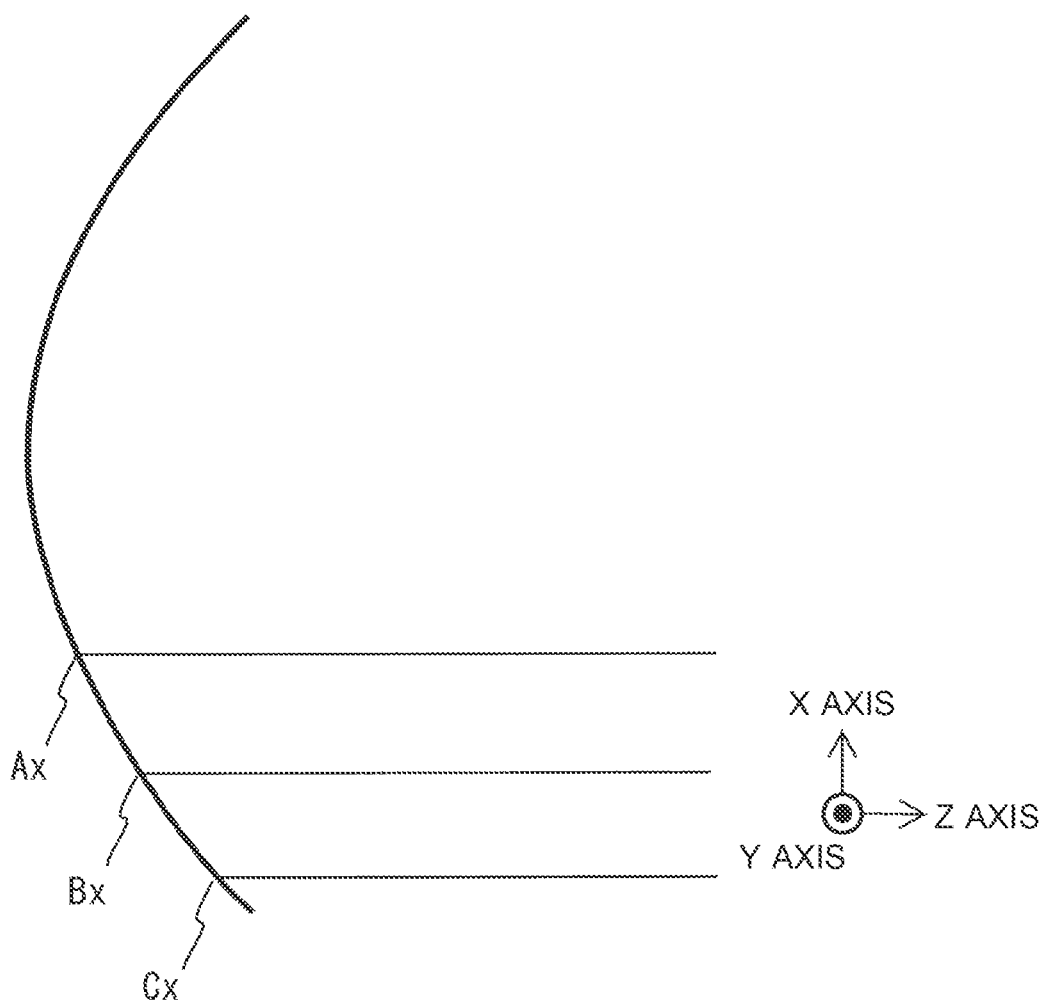

Next, in order to grasp the asymmetry of the windshield 6 quantitatively, a local curvature radius will be explained. FIG. 14(a) is a view of projection of the projection of the windshield 6 on the YZ plane. FIG. 14(b) is a view of projection of the windshield 6 on the XZ plane.

As shown in FIG. 14(a), the shape of the windshield 6 projected on the YZ plane is arc-like. As shown in FIG. 14(b), the shape of the windshield 6 projected on the XZ plane is also arc-like. The asymmetry of the windshield 6 can be quantitatively grasped by calculating the curvature radii of these arcs.

As shown in FIG. 14(a), the luminous flux corresponding to each view-point is assumed as three light rays passing through two points, an upper and a lower point, and a center point on the Y axis of the eye-box 8. When the intersections of these three light rays on the windshield 6 are projected on the YZ plane, they are expressed as three points (Ay, By, Cy) corresponding to the respective light rays. The curvature radius of the circle determined by these three points (Ay, By, Cy) on the YZ plane is a local curvature radius which corresponds to the view-point.

In other words, the luminous flux corresponding to an arbitrary point in a virtual image visually recognized on the virtual image plane 7 is considered as three light rays which pass through three points on the Y axis of the eye-box 8. The intersections at which the three light rays intersect the windshield 6 are assumed as the upper point (Ay), lower point (Cy), and center point (By) between Ay and Cy on the Y axis. The curvature radius of the circle determined by the three points Ay, By, and Cy is the curvature radius on the YZ plane at a position where the windshield 6 reflects the light rays corresponding to the arbitrary point in the virtual image visually recognized on the virtual image plane 7.

Furthermore, as shown in FIG. 14(b), the luminous flux corresponding to each view-point is assumed as three light rays passing through two points, a left and a right point, and a center point on the X axis of the eye-box 8. When the intersections of these three light rays on the windshield 6 are projected on the XZ plane, they are expressed as three points (Ax, Bx, Cx) corresponding to the respective light rays. The curvature radius of the circle determined by these three points (Ax, Bx, Cx) on the XZ plane is a local curvature radius which corresponds to the view-point.

In other words, the luminous flux corresponding to an arbitrary point in a virtual image visually recognized on the virtual image plane 7 is considered as three light rays which pass through three points on the X axis of the eye-box 8. The intersections at which the three light rays intersect the windshield 6 are assumed as the right point (Ax), left point (Cx), and center point (Bx) between Ax and Cx on the X axis respectively. The curvature radius of the circle determined by the three points Ax, Bx, and Cx is the curvature radius on the XZ plane at a position where the windshield 6 reflects the light rays corresponding to the arbitrary point in the virtual image visually recognized on the virtual image plane 7.

Figure 23:
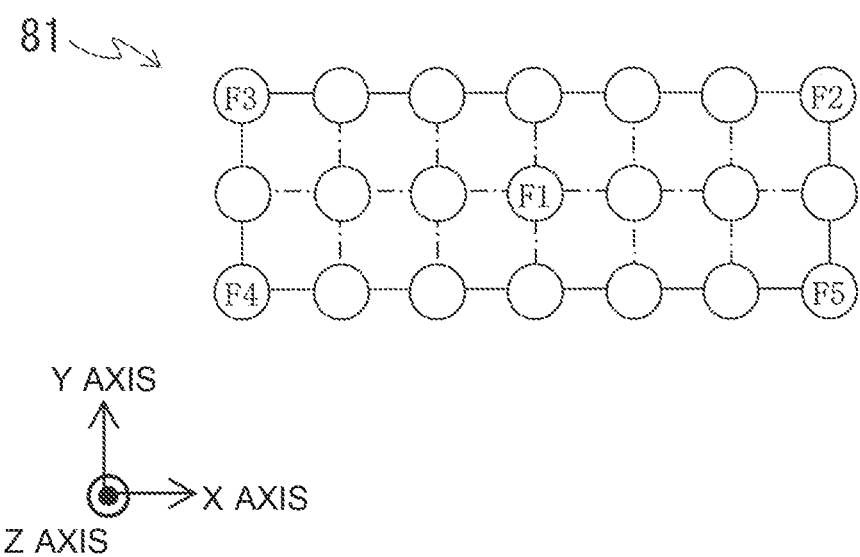
FIG. 23 is a view which explains a field of view according to the present invention.

First, the luminous flux corresponding to the arbitrary point on the virtual image plane 7, in the same coordinate system as the coordinate system of the eye-box 8 shown in FIG. 13, defines all corresponding points on the eye-box 8 as a field of view FIELD OF VIEW 81. The field of view 81 may also be said to be an aggregate of points corresponding to light rays which correspond to an arbitrary point on the virtual image plane 7 in the range of the eye-box 8. FIG. 23 illustrates 21 points included in the field of view 81. In the explanation below, these 21 points will be used as appropriate.

Figure 22A:
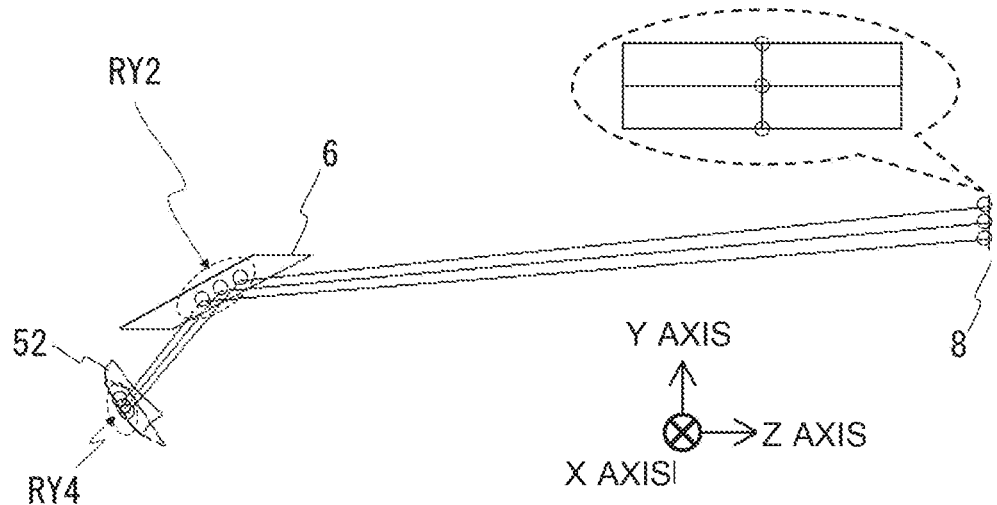
FIGS. 22A and 22B are a view which explains local curvature radii of the windshield and free-form surface concave mirror according to the present invention.

As shown in FIG. 22(a), three light rays related to an arbitrary point included in the field of view 81 corresponding to a point included in the virtual image on the virtual image plane 7 are assumed. The curvature radius of the circle passing through three points as projections on the YZ plane of three points at which the light rays intersect the windshield 6 is defined as "curvature radius RY2". Also, the curvature radius of the circle passing through three points at which the same three light rays intersect the reflective surface of the free-form surface concave mirror 52 is defined as "curvature radius RY4".

Figure 22B:
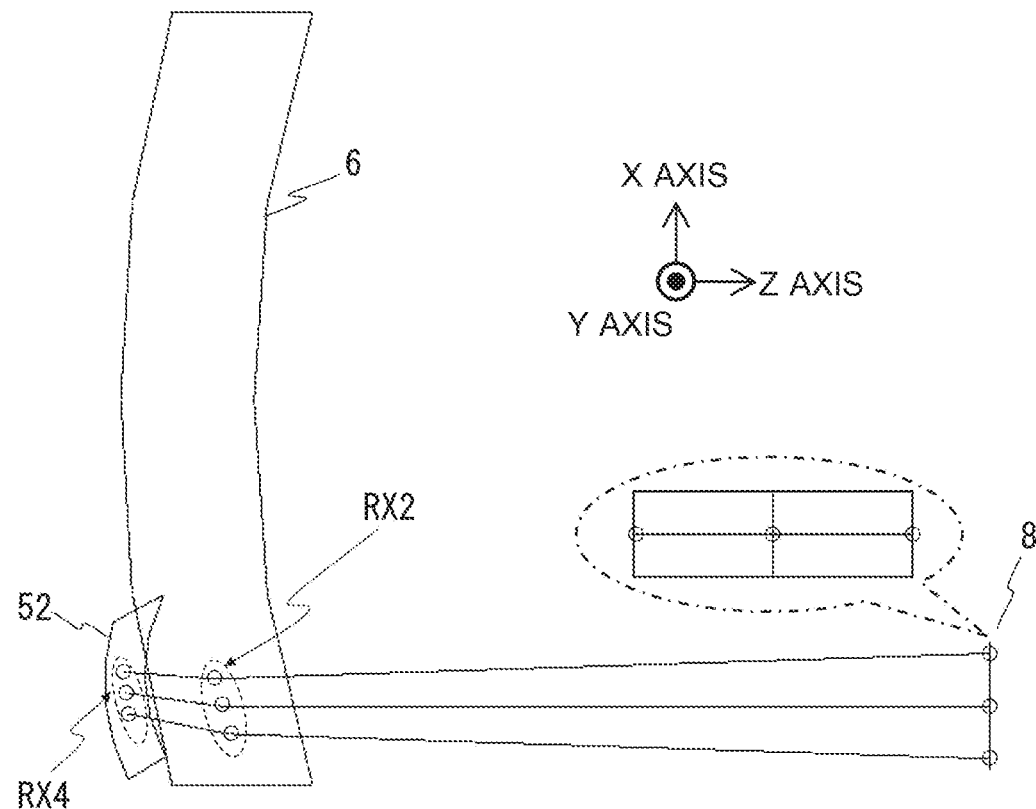

As shown in FIG. 22(b), three light rays related to an arbitrary point included in the field of view 81 corresponding to a point included in the virtual image on the virtual image plane 7 are assumed. The curvature radius of the circle passing through three points as projections on the XZ plane of three points at which the light rays intersect the windshield 6 is defined as "curvature radius RX2". Also, the curvature radius of the circle passing through three points at which the same three light rays intersect the reflective surface of the free-form surface concave mirror 52 is defined as "curvature radius RX4".

As mentioned above, the description of this embodiment, the curvature radius RY2 and curvature radius RX2 indicate local curvature radii on the windshield 6. Also, the curvature radius RY4 and curvature radius RX4 indicate local curvature radii on the free-form surface concave mirror 52.

Furthermore, if the curvature radius of the concave surface of a spherical mirror is positively defined, the spherical mirror holds the relation "focal length=(curvature radius)/2" and thus the spherical mirror holds the relation "refraction power=1/focal length=2/(curvature radius)".

Next, an example of the curvature radius RY2 and curvature radius RX2 defined above will be explained. In the example Given below, the curvature radius RY2 and curvature radius RX2 at the 21 points included in the field of view 81 are illustrated using a coordinate system related to the eye-box 8. As shown in FIG. 23, in the 21 points included in the field of view 81, the center point in the X axis direction and Y axis direction of the coordinate system related to the eye-box 8 is called "F1". Also, the point at the right end in the X axis direction and at the uppermost end in the Y axis direction is called "F2". Also, the point at the leftmost end in the X axis direction and at the uppermost end in the Y axis direction is called "F3". Also, the point at the leftmost end in the X axis direction and at the lowermost end in the Y axis direction is called "F4". Also, the point at the rightmost end in the X axis direction and at the lowermost end in the Y axis direction is called "F5".

FIG. 15 is a view which explains the curvature radius RY2 and curvature radius RX2 corresponding to the above-described 21 points in the field of view 81 (hereinafter called "21 points") by applying the definitions explained referring to FIG. 14. FIG. 15(a) is a table which shows a concrete example of the curvature radii RY2 corresponding to the 21 points in the field of view 81. FIG. 15(b) is a table which shows a concrete example of the curvature radii RX2 corresponding to the 21 points in the field of view 81. FIG. 15(c) is a table which shows a concrete example of change in the refraction power (A refraction power) of the windshield 6 corresponding to the 21 points in the field of view 81. The refraction power on the YZ cross section of the windshield 6 and the refraction power on the XZ cross section are largely different. Therefore, the A refraction power shown in FIG. 15(c) is expressed using the change in the average of the refraction power on the YZ cross section and the refraction power on the XZ cross section in the windshield 6.

As shown in FIG. 15, the value of curvature radius RY2 is in the range from 6441 (mm) to 6691 (mm). Since all the values of curvature radius RY2 are large, the refraction power on the YZ cross section is small. On the other hand, the value of curvature radius RX2 is in the range from 1074 (mm) to 1206 (mm). Since all the values of curvature radius RX2 are small, the refraction power on the XZ cross section is large.

In other words, in the windshield 6, the refraction power on the YZ plane is 1/5.8 times the refraction power on the XZ cross section at the center (F1) of the field of view 81. As for the value of curvature radius RX2 on the XZ plane where the reflection power is large, the difference between the maximum value and minimum value is as large as 132 mm. As explained above, the refraction Power of the windshield 6 is locally uneven.

As explained above, the windshield 6 has asymmetry which includes not only the difference between the refraction power on the YZ plane and the refraction power on the XZ plane but also unevenness of refraction power on the same cross section. Therefore, the free-form surface concave mirror 52 must compensate for the asymmetry in the windshield 6. For this reason, a free-form surface concave mirror 52 which has a rotationally asymmetric shape parameter is used as an optical element which compensates for this asymmetry.

Figure 16:
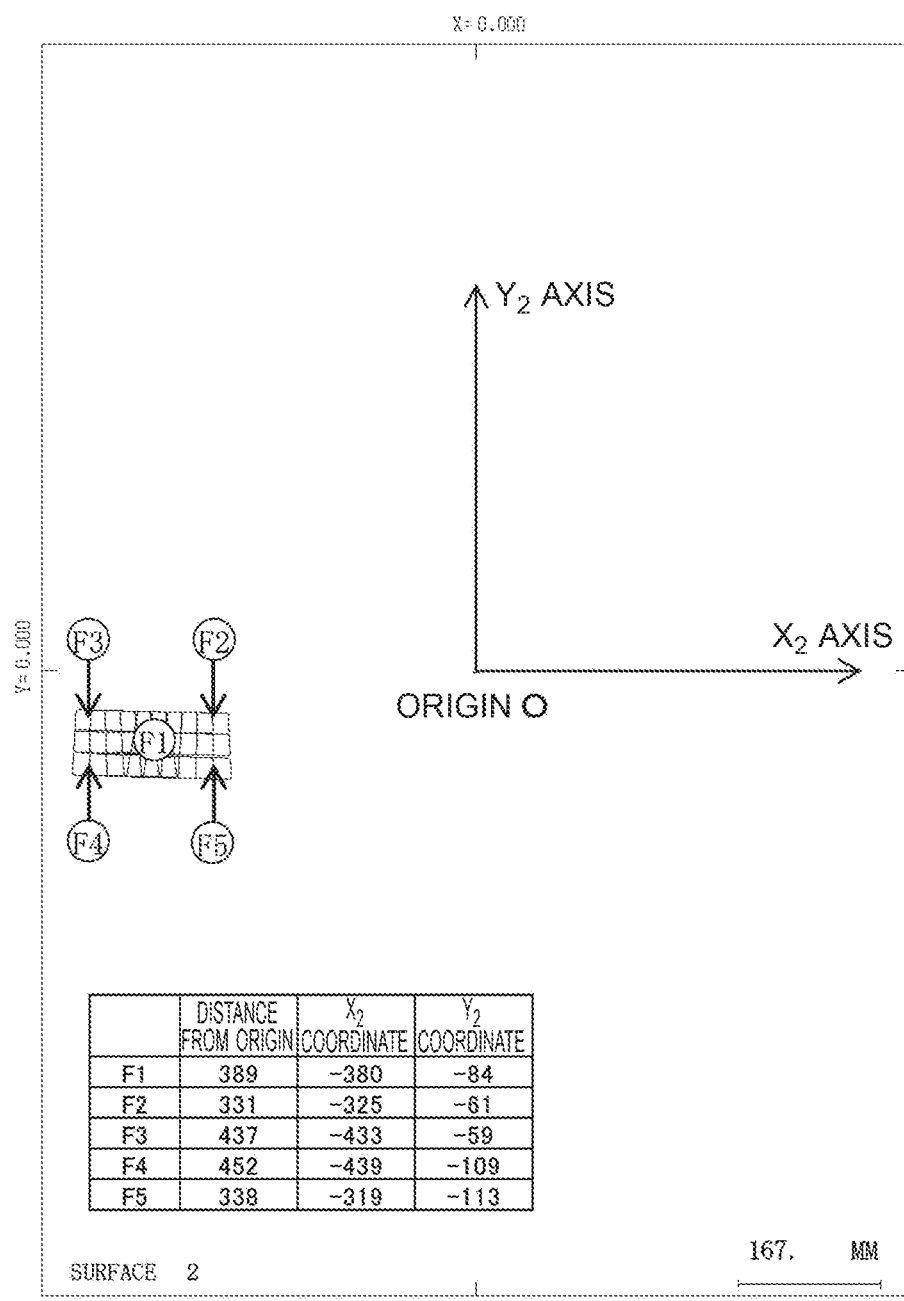
FIG. 16 is a view which shows an example of the luminous flux range of the windshield according to the first embodiment.

Next, the luminous flux range in the windshield 6 will be explained. FIG. 16 is a view which shows the luminous flux range in the windshield 6 bilaterally symmetric with respect to the vehicle. The coordinate axes of the windshield 6 are defined as shown in FIG. 16. Specifically, the horizontal direction of the windshield 6 is defined as $X_2$ axis and the vertical axis is defined as $Y_2$ axis. Origin O as the intersection of the $X_2$ axis and $Y_2$ axis is the midpoint in the horizontal direction of the windshield 6 and also the midpoint in the height direction of the vehicle 500 (see FIG. 24) provided with the windshield 6.

As shown in FIG. 16, the luminous flux range in the windshield 6 which corresponds to the field of view 81 largely deviates from the origin O in the negative direction of the $X_2$ axis. For example, the center position ADX2 of the luminous flux at the center (F1) of the field of view 81 on the windshield 6 is ADX2=−380 mm. In short, the windshield 6 is largely asymmetric in the $X_2$ axis direction. In the $Y_2$ axis, this varies depending on the definitional equation representing the shape of the windshield 6, but even in that case, the local curvature radius distribution is the same as in FIG. 15.

The shape of the windshield 6 is concave with respect to reflected light. Therefore, the refraction power of the windshield 6 has a positive value. Also, the shape of the free-form surface concave mirror 52 is also concave, so its refraction power has a positive value. Therefore, the free-form surface concave mirror 52 which reflects an image luminous flux to the windshield 6 must supplement the refraction power of the windshield 6 on the YZ cross section. Specifically, in the free-form surface concave mirror 52, the refraction power on the YZ cross section is made larger than the refraction power on the XZ cross section. In other words, in the free-form surface concave mirror 52, the curvature radius on the YZ cross section is made smaller than the curvature radius on the XZ cross section.

The conditions required to determine the shapes of the windshield 6 and free-form surface concave mirror 52 are important to ensure compactness of the HUD 100 according to this embodiment. The reason is explained below.

Generally, in an optical system with many optical elements, the aberration generated in a lens is corrected by using another lens which generates an aberration amount opposite to that aberration amount. For example, the aberration amount is corrected by combining a plurality of convex lenses and concave lenses. Therefore, in order to correct asymmetry in refraction power using many optical elements as usual, many optical elements must be used. If this approach is adopted for the HUD 100 according to this embodiment, the HUD 100 cannot be compact.

Therefore, the HUD 100 according to this embodiment uses minimum necessary optical elements to make up a projection optical system 10 to correct local refraction power in the windshield 6. Concretely, correction is made not by negating locally large refraction power in the windshield 6 but by generating locally large refraction in the free-form surface concave mirror 52 for locally small refraction power in the windshield 6.

The reason for adoption of the above correction method is that in order to display a virtual image of a Given size, the HUD 100 must have refraction power. In other words, if the refraction power of the HUD 100 is adjusted so as to be small, the HUD 100 cannot provide the prescribed refraction power.

Summing up the above explanation, for the windshield 6, the curvature radius RY2 of projection on the YZ plane is largely different from the curvature radius RX2 of projection on the XZ plane. The ratio between them at the center (F1) in the field of view 81 is 5.8 times (6606/1131≈5.8). The difference between the maximum value and minimum value in the curvature radius RX2 is 132 mm (F2-F4=1206-1074=132 (mm)). As explained above, the windshield 6 has a bilaterally asymmetric shape.

Next, an explanation will be given of the free-form surface concave mirror 52 which is bilaterally asymmetric and has a locally varied curvature radius and thereby compensates the windshield 6 which has a locally varied refractive index.

Like the figure used for description of the windshield 6, FIG. 17 is a view which explains the local curvature radius RY4 and local curvature radius RX4 in the free-form surface concave mirror 52 by applying the definitions explained referring to FIG. 14.

FIG. 17(*a*) is a view which shows a concrete example of the curvature radii RY4 corresponding to the 21 points in the field of view 81. FIG. 17(*b*) is a view which shows a concrete example of the curvature radii RX4 corresponding to the 21 points in the field of view 81. FIG. 17(*c*) is a view which shows a concrete example of change in the refraction power (Δ refraction power) of the free-form surface concave mirror 52 corresponding to the 21 points in the field of view 81.

As shown in FIG. 17, the value of curvature radius RY4 is in the range from 229 (mm) to 349 (mm). Since all the values of curvature radius RY4 are small, the refraction power on the YZ cross section is large. On the other hand, the value of curvature radius RX4 is in the range from 338 (mm) to 406 (mm). In the free-form surface concave mirror 52, the difference in refraction power at the center (F1) of the field of view 81 is approximately 1.3 times (358/282≈1.3). Thus, by increasing the refraction power of the free-form surface concave mirror 52 on the YZ cross section, the refraction power on the YZ cross section of the windshield 6 can be supplemented.

As explained above referring to FIG. 15, it is at the part corresponding to the rightmost upper point (F2) in the field of view 81 that the local curvature radius RX2 in the windshield 6 is maximum. Also, it is at the part corresponding to the leftmost lower point (F4) in the field of view 81 that the local curvature radius RX2 in the windshield 6 is minimum.

On the other hand, it is at the part corresponding to the leftmost upper point (F3) in the field of view 81 that both the local curvature radius RY4 and local curvature radius RX4 in the free-form surface concave mirror 52 are maximum. It is at the part corresponding to the rightmost upper point (F2) in the field of view 81 that the local curvature radius RY4 in the free-form surface concave mirror 52 is minimum. It is also at the part corresponding to the rightmost lower point (F5) in the field of view 81 that the local curvature radius RX4 in the free-form surface concave mirror 52 is minimum.

In other words, in the projection optical system 10 according to this embodiment, a view-point in the windshield 6 where refraction power is small and a view-point in the free-form surface concave mirror 52 where refraction power is large are on the same side in the left/right direction.

Next, the luminous flux range in the free-form surface concave mirror 52 will be explained referring to FIG. 18. Here, in the coordinate system defining the free-form surface concave mirror 52 which is used for explanation, the X axis is expressed as "$X_4$ axis" and the Y axis is expressed as "$Y_4$ axis". The free-form surface concave mirror 52 is largely asymmetric on each of the $X_4$ axis and $Y_4$ axis.

Figure 18:
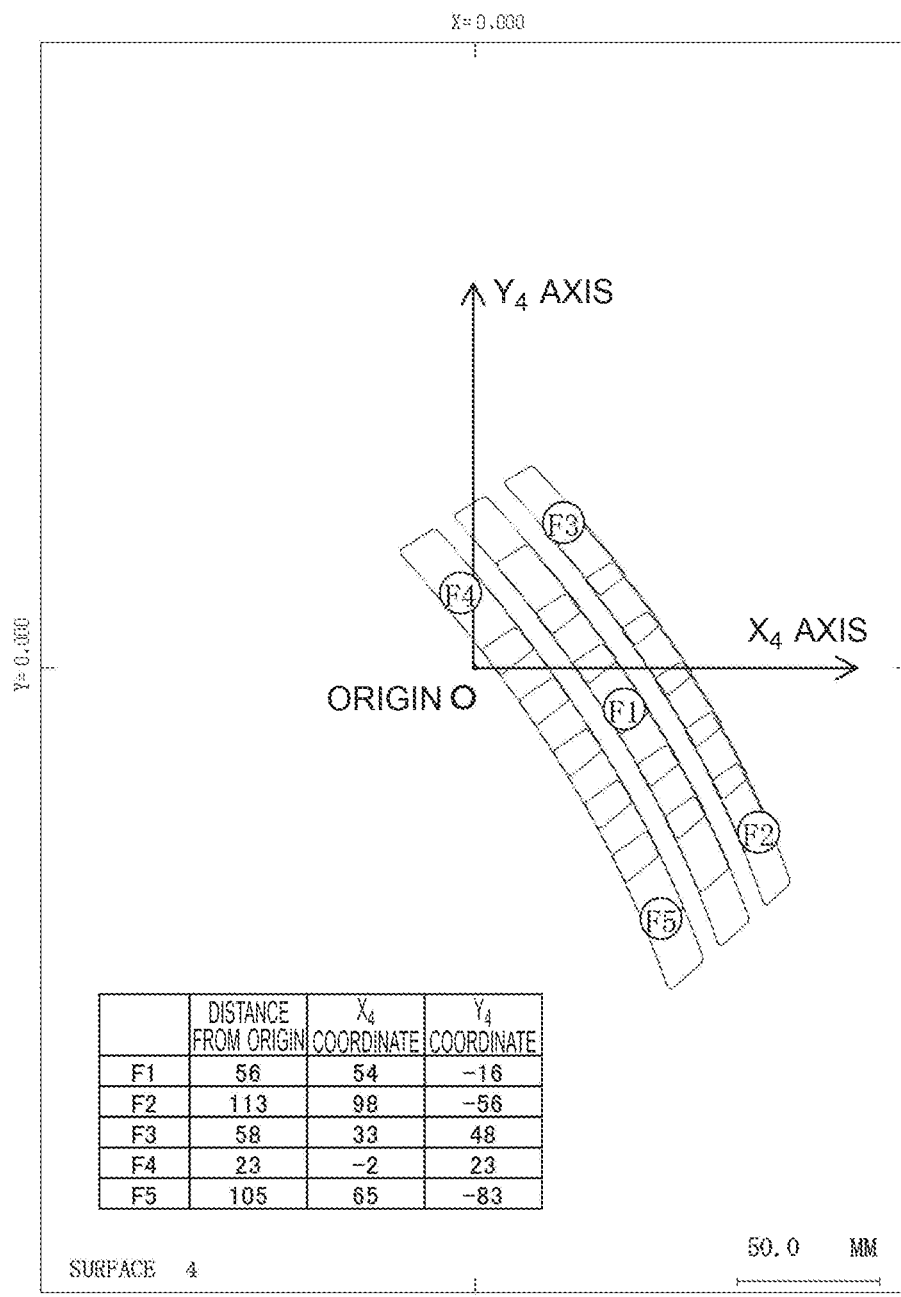
FIG. 18 is a view which shows an example of the luminous flux range of the free-form surface concave mirror according to the first embodiment.

The luminous flux range corresponding to the points (F1 to F21) in the field of view 81, namely the effective luminous flux range on the free-form surface concave mirror 52 is expressed in the above coordinate system as shown in FIG. 18. As apparent from FIG. 18, regarding the center position (F1) of the free-form surface concave mirror 52 according to this embodiment, when comparison is made between the absolute value of the position corresponding to the $X_4$ axis and the absolute value of the position corresponding to the $Y_4$ axis, the absolute value of the position corresponding to the $X_4$ axis is larger.

Furthermore, the long side of the effective luminous flux range on the free-form surface concave mirror 52 is inclined with respect to the $X_4$ axis as expressed in the above coordinate system. This inclination is equal to or bigger than 45 degrees.

The reason for making the luminous flux range in the free-form surface concave mirror 52 asymmetric as mentioned above is to compensate for the smallness of the refraction power on the right side in the field of view 81 in the windshield 6 (for the largeness of the curvature radius RX2). In short, the reason is to increase the refraction power on the right side in the field of view 81 in the free-form surface concave mirror 52.

Although the definitional equation of the free-form surface shape of the free-form surface concave mirror 52 is stated later, the free-form surface shape involves a polynomial expression related to the $X_4$ axis and $Y_4$ axis, so it is easier to control the amount of sag of the surface shape in a remoter position from the origin of the free-form surface shape.

For example, generally, even in the case of a rotationally symmetric aspheric surface shape, the change in the amount of sag near the optical axis is small, but the change in the amount of sag is larger as the distance from the optical axis is larger. This is also the same for a free-form surface; as the distance from the optical axis is larger, the influence of a higher-order coefficient on the amount of sag is larger. In short, as the distance from the optical axis is larger, the local curvature radius can be smaller.

Applying this to the free-form surface concave mirror 52, it is desirable that light rays to the view-points corresponding to right side positions (F2 and F5 in FIG. 18) among the positions corresponding to the field of view 81 in the free-form surface concave mirror 52 be in a positional relation to be remoter from the optical axis of the free-form surface concave mirror 52. For example, the center position ADX4 of the luminous flux at the center (F1) in the field of view 81 on the free-form surface concave mirror 52 is ADX4=54 mm. This value has a sign opposite to the sign of ADX2=−380 mm in the explanation related to the windshield 6.

Next, an embodiment of the projection optical system according to this embodiment will be further described. The projection optical system 10 according to this embodiment is structured so as to compensate for insufficiency of local refraction power in the windshield 6 by using the locally large refraction power in the free-form surface concave mirror 52. The HUD 100 which includes the projection optical system 10 thus structured is suitable as a compact HUD.

First Embodiment

As described referring to FIG. 19, the HUD 100 according to this embodiment is characteristic in the structure of the ocular optical system 5. First, the windshield 6 and ocular optical system 5 which constitute the projection optical system 10 are described below referring to FIG. 1.

Figure 1A:
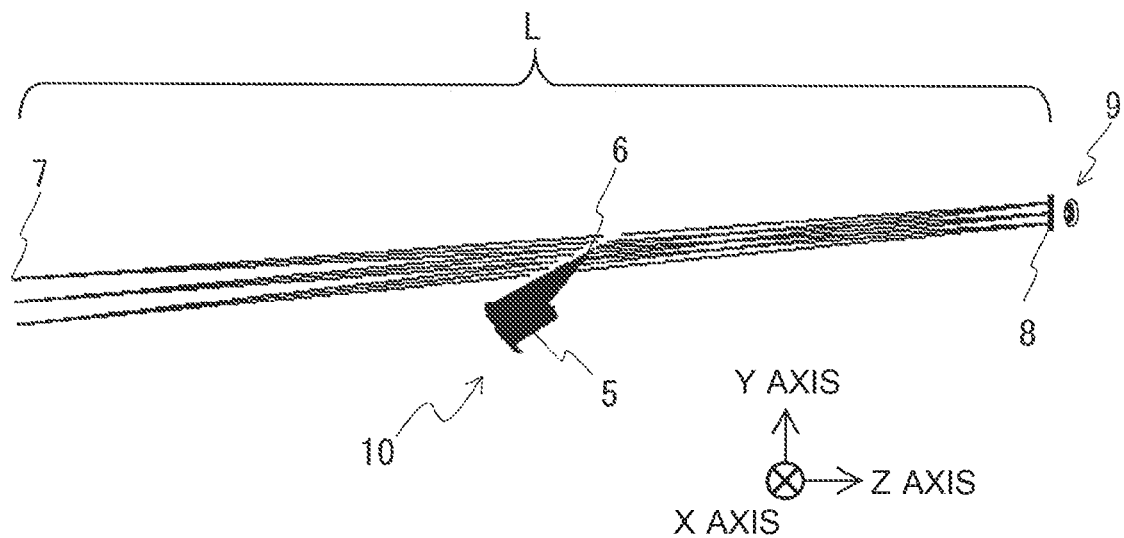
FIG. 1A shows a situation that image information on a virtual image plane 7 is viewed on the YZ plane through the eyes of a viewer and FIG. 1B shows a situation that the image information on the virtual image plane 7 is viewed on the XZ plane through the eyes of the viewer.
Figure 1B:
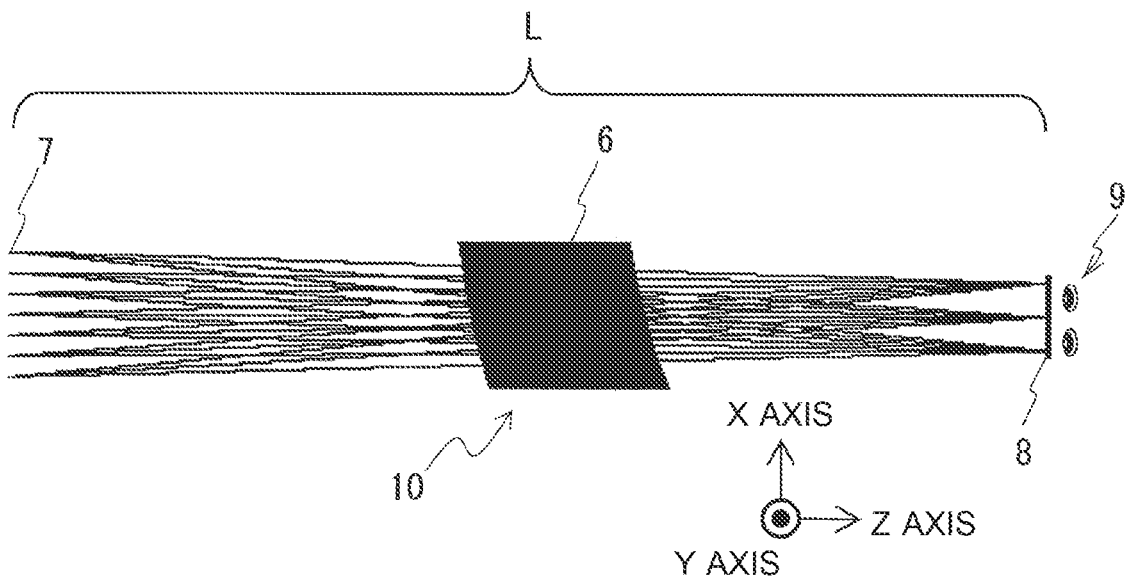

FIG. 1 is an overall light ray view of the ocular optical system 5 in the first embodiment. In FIG. 1, the horizontal direction of the eye-box 8 is defined as X axis, the vertical direction of the eye-box 8 is defined as Y axis, and the axis orthogonal to the X axis and Y axis is defined as Z axis. FIG. 1(*a*) shows a situation that image information on the virtual image plane 7 is viewed on the YZ plane through the eye 9 of a viewer. FIG. 1(*b*) shows a situation that the image information on the virtual image plane 7 is viewed on the XZ plane through the eye 9 of the viewer.

In FIG. 1, in the windshield 6, only the area where an effective luminous flux passes in the HUD 100 is shown. The windshield 6 is symmetric with respect to the widthwise direction (left-right direction) of the vehicle 500, as already explained referring to FIGS. 13 and 24.

Figure 2:
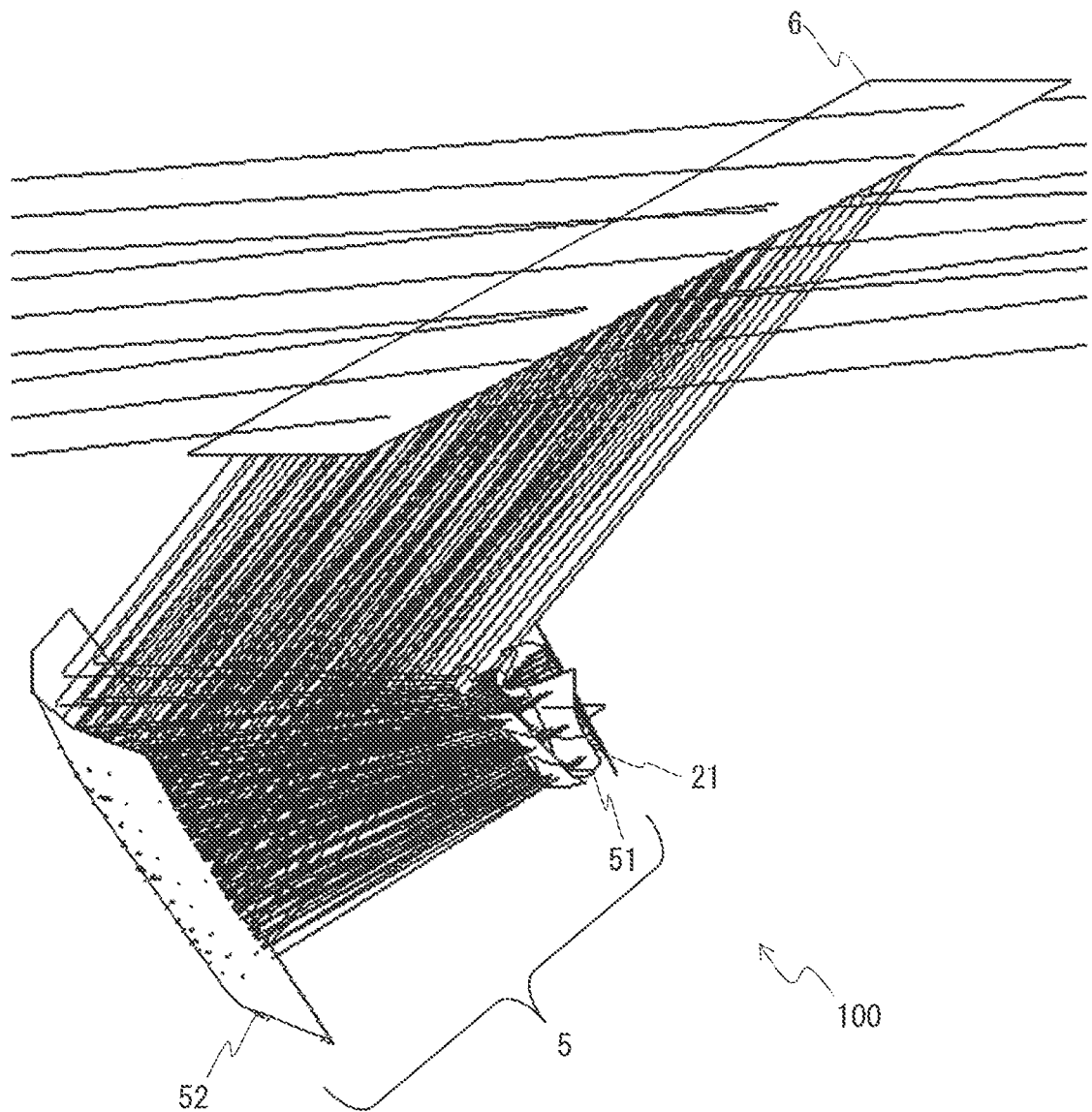
FIG. 2 is an enlarged view of the main part of the ocular optical system according to the first embodiment.

Next, details of the ocular optical system 5 according to the first embodiment will be further described. FIG. 2 is an enlarged view of the main part of the ocular optical system 5 according to this embodiment. As shown in FIG. 2, the ocular optical system 5 according to this embodiment is structured in a manner that a free-form surface lens 51, free-form surface concave mirror 52, and windshield 6 are arranged in order from a polarizing plate 21 as a component of the liquid crystal display panel 22.

The free-form surface lens 51 is a lens with negative refraction power which has a convex surface facing the free-form surface concave mirror 52. The free-form surface concave mirror 52 is a mirror with positive refraction power. In FIG. 2, the front and back faces of the free-form surface lens 51 are expressed as a surface. The refraction power of the ocular optical system 5 including these optical devices (optical elements) is mainly borne by the free-form surface concave mirror 52.

In the free-form surface lens 51 located remotely from the free-form surface concave mirror 52, the light ray height of main light rays is large. Therefore, the free-form surface lens 51 has a function to compensate for trapezoidal distortion. In the ocular optical system 5 according to this embodiment, the free-form surface lens 51 is located just under the optical path of a luminous flux which goes toward the windshield 6 after being reflected by the free-form surface concave mirror 52. This positional relation makes it possible that the overall size of the HUD 100 including the ocular optical system 5 according to this embodiment is compact.

<Lens Data>

Next, lens data in the HUD 100 according to this embodiment will be explained referring to FIG. 3. First, each item in the lens data shown in FIG. 3 is explained below.

"NAME" is a name which corresponds to each optical element and "MIRROR 1" corresponds to the windshield 6. "MIRROR M2" corresponds to the free-form surface concave mirror 52. "FREE-FORM SURFACE LENS" corresponds to the free-form surface lens 51. "POLARIZING PLATE" corresponds to the polarizing plate 21. "COVER GLASS" corresponds to the member which protects the display surface of the liquid crystal display panel 22. "IMAGE PLANE LCD" corresponds to the liquid crystal display panel 22.

"PLANE NO." represents a plane which corresponds to each optical element in which the virtual image plane 7 as an object plane is taken as plane 0 and the luminous flux to generate a state which enables viewing of a virtual image on the virtual image plane 7 is traced back. DUMMY PLANE in the "NAME" column indicates not a real physical optical element but an element corresponding to a parameter used to determine the arrangement of an optical element.

"CURVATURE RADIUS" is expressed with a positive sign if the center position of a curvature radius is in the travelling direction. "INTER-PLANE DISTANCE" represents the distance on the optical axis from the apex position of each plane to the apex position of the next plane.

"GLASS MATERIAL NAME" represents the material of the relevant optical element. In the material name column, "50.30" represents a material with a refractive index of 1.50 and Abbe number 30. Also, "52.60" represents a material with a refractive index of 1.51 and Abbe number 60.

"DECENTERING/TURN" represents decentering and turn which occur on the relevant plane in this order, in which "ORDINARY DECENTERING" means that the next plane is placed in the inter-plane distance position on a new coordinate system in which decentering and turn have occurred. "DECENTER AND RETURN" occurs only on that plane and does not affect the next plane.

"DECENTERING" represents the distance (mm) from the origin 0 in each of the X axis direction, Y axis direction, and Z axis direction. "TURN" represents the amount of rotation (degrees) in rotation around the X axis, rotation around the Y axis, and rotation around the Z axis. For rotation around the X axis, clockwise rotation as seen in the positive direction of the X axis is taken as positive; for rotation around the Y axis, clockwise rotation as seen in the positive direction of the Y axis is taken as positive; and for rotation around the Z axis, counterclockwise rotation as seen in the positive direction of the Z axis is taken as positive.

Next, the free-form surface concave mirror 52 according to this embodiment and the free-form surface coefficients concerning the free-form surface lens 51 are shown in FIG. 4. The free-form surface coefficients shown in FIG. 4 are calculated from the equation 1 below.

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n)$$

$$j = [(m+n)^2 + m + 3n]/2 + 1$$

[Equation 1]

Free-form surface coefficient C represents a rotationally asymmetric shape with respect to each optical axis (Z axis) which is a shape defined by a circular cone term component and an XY polynomial term component. For example, if X is quadratic (m=2) and Y is cubic (n=3), the shape corresponds to coefficient which represents j={(2+3)²+2+3×3}/2+1=19. The position of each optical axis of a free-form surface is determined by the amount of DECENTERING/TURN shown in FIG. 3.

In this embodiment, a concrete example of the size of the eye-box 8 and view angle in the ocular optical system 5 is shown in Table 1. As for the numeric values in Table 1, a value for the horizontal direction is given first and a value for the vertical direction is given next.

TABLE 1

| | |
|---|---|
| Size of eye-box 8 | 130 × 40 mm |
| Effective size of image light in liquid crystal display panel 22 | 37.2 × 18.7 mm |
| Size of virtual image plane 7 | 240 × 90 mm |
| View angle (full field angle) | 6.9 × 2.6 degrees |
| Inclination | 5 degrees |
| Virtual image distance (L) | 2 m |

Next, the optical performance of the first embodiment will be explained referring to FIGS. 5 to 12. FIGS. 5 to 9 are views which show the distortion performance of the HUD 100 according to the first embodiment. FIGS. 10 to 12 are spot views of the HUD 100 according to the first embodiment.

Figure 5:
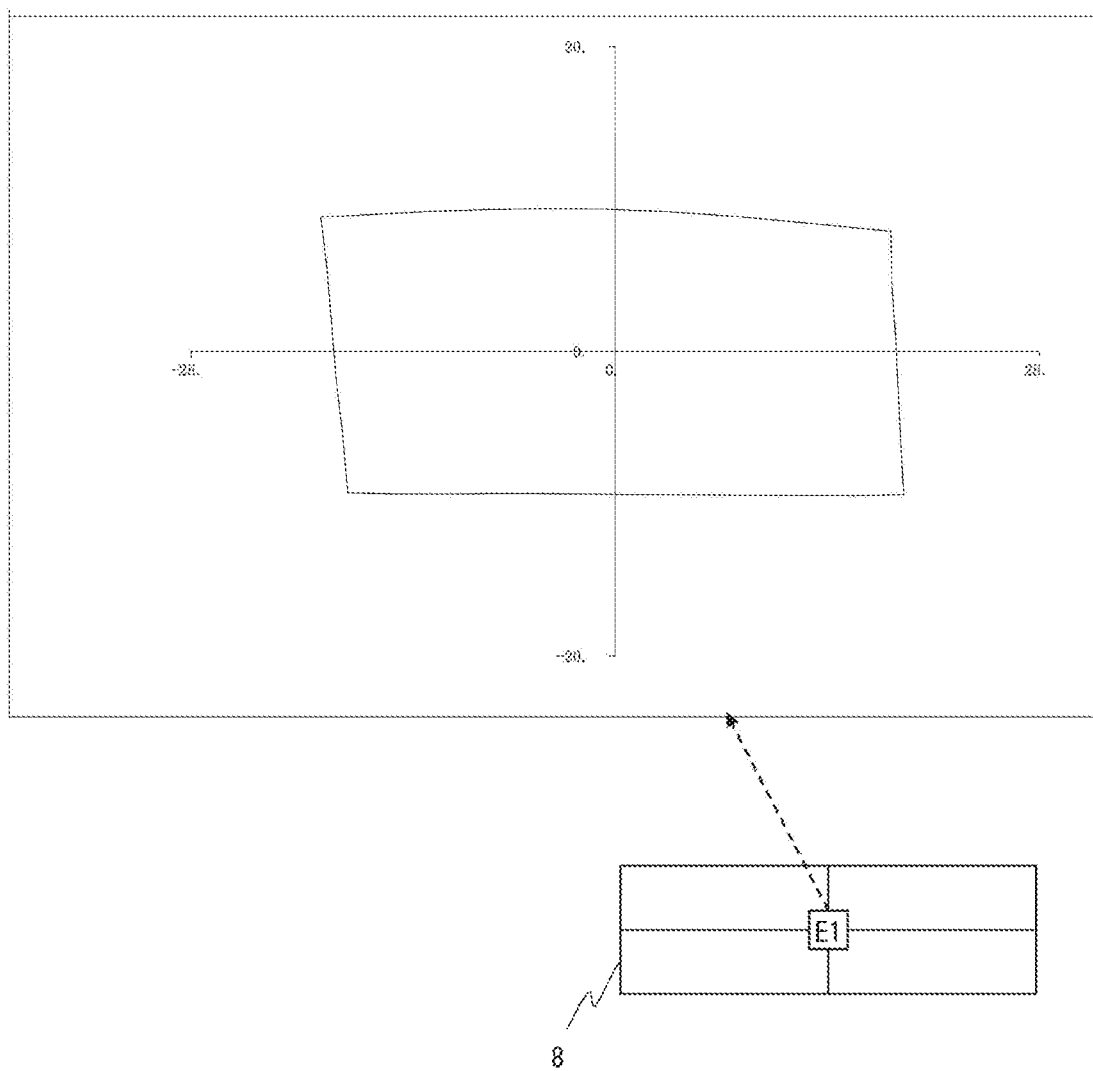
FIG. 5 is a view which shows distortion performance as seen from the center of the eye-box according to the first embodiment.
Figure 6:
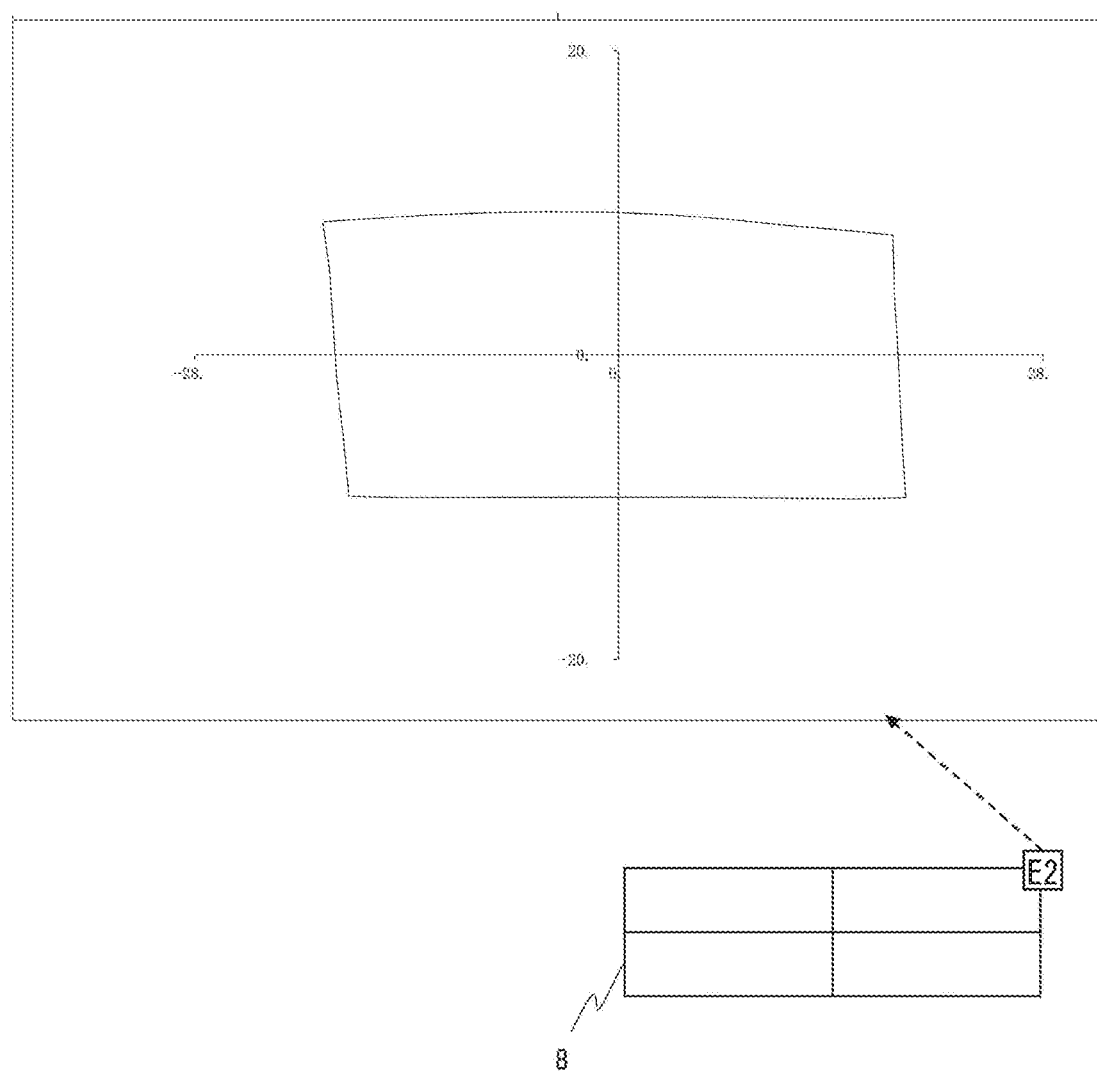
FIG. 6 is a view which shows distortion performance as seen from the right upper side of the eye-box according to the first embodiment.
Figure 7:
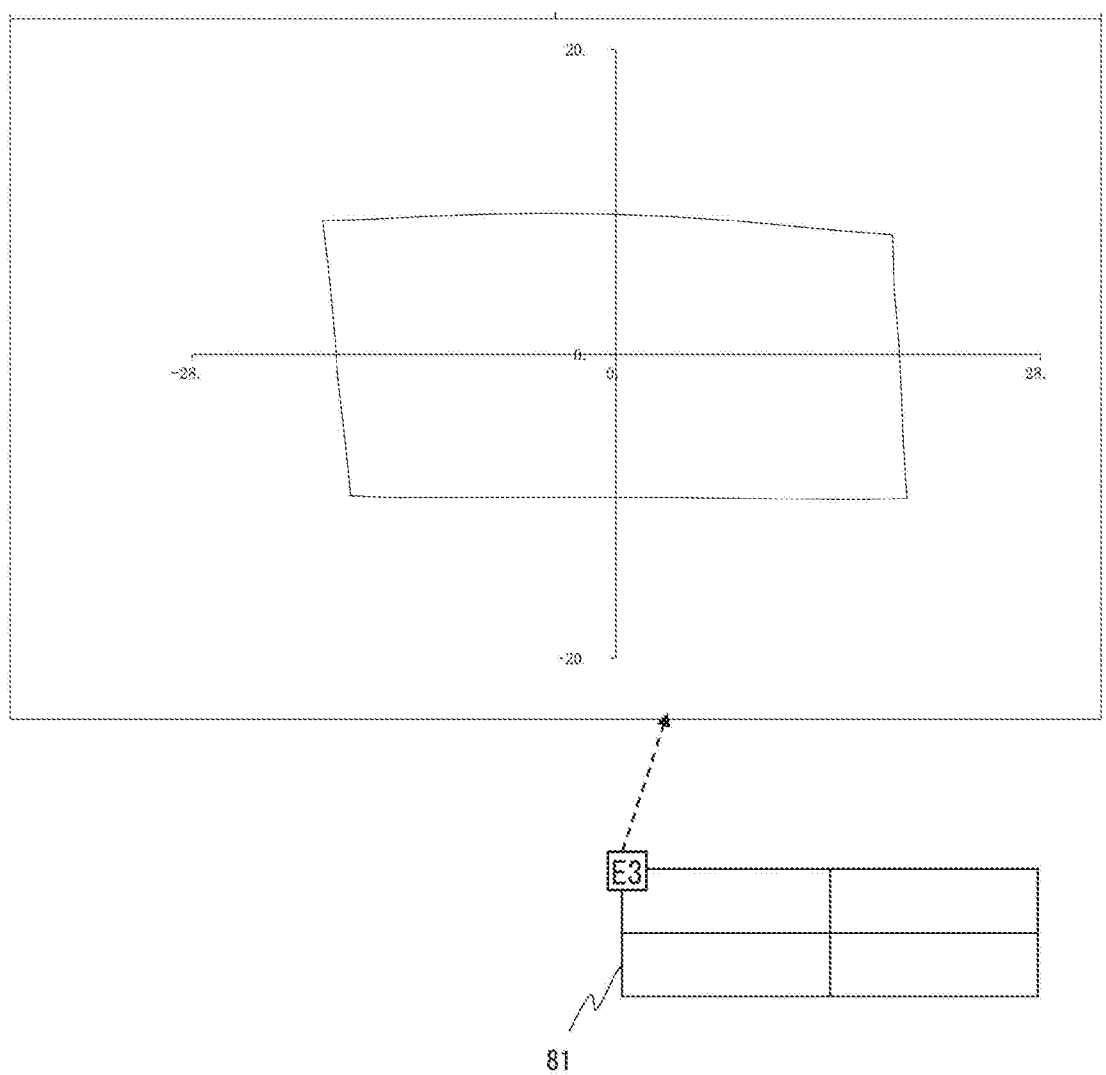
FIG. 7 is a figure which shows distortion performance as seen from the left upper side of the eye-box according to the first embodiment.
Figure 8:
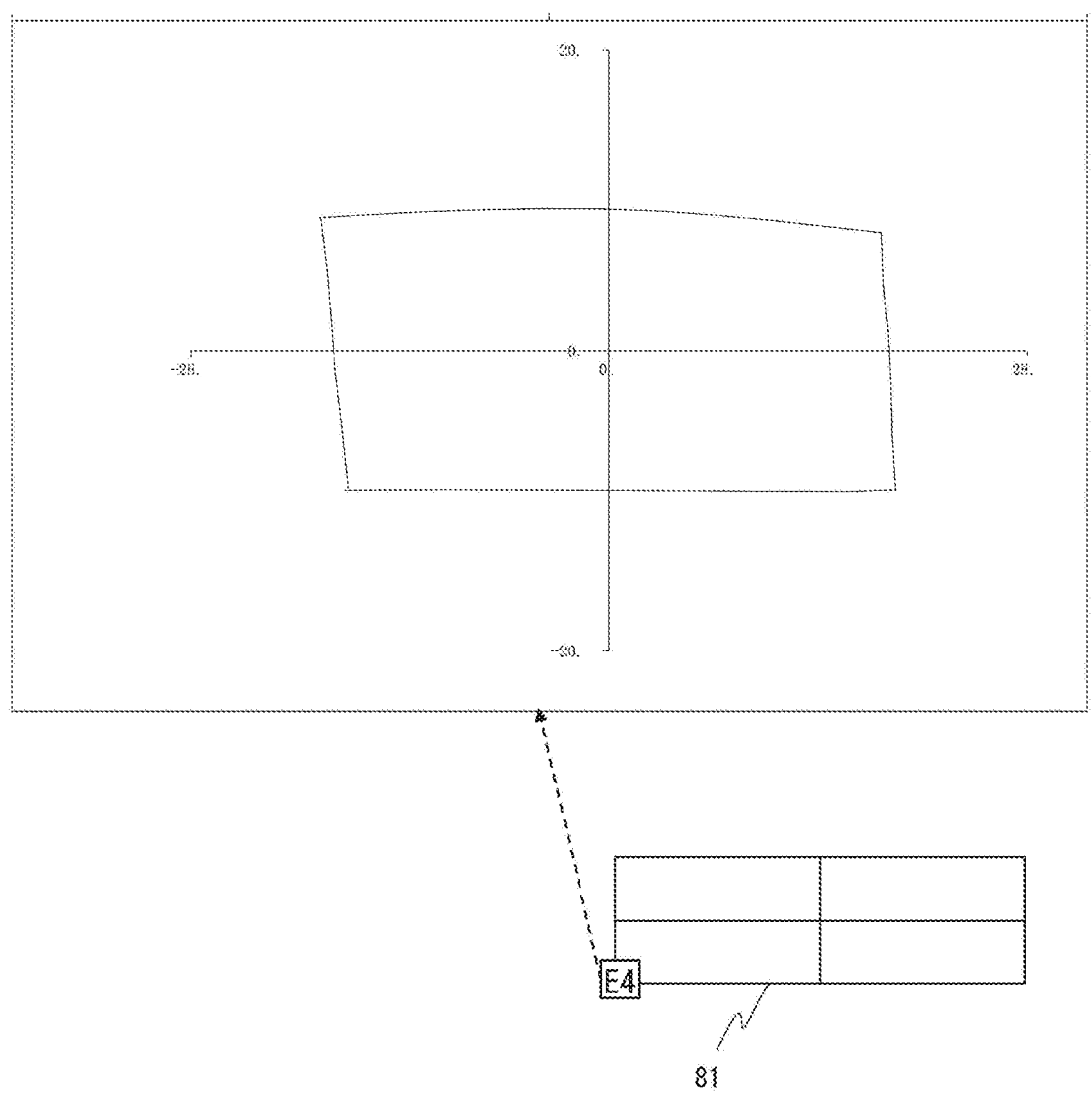
FIG. 8 is a view which shows distortion performance as seen from the left lower side of the eye-box according to the first embodiment.
Figure 9:
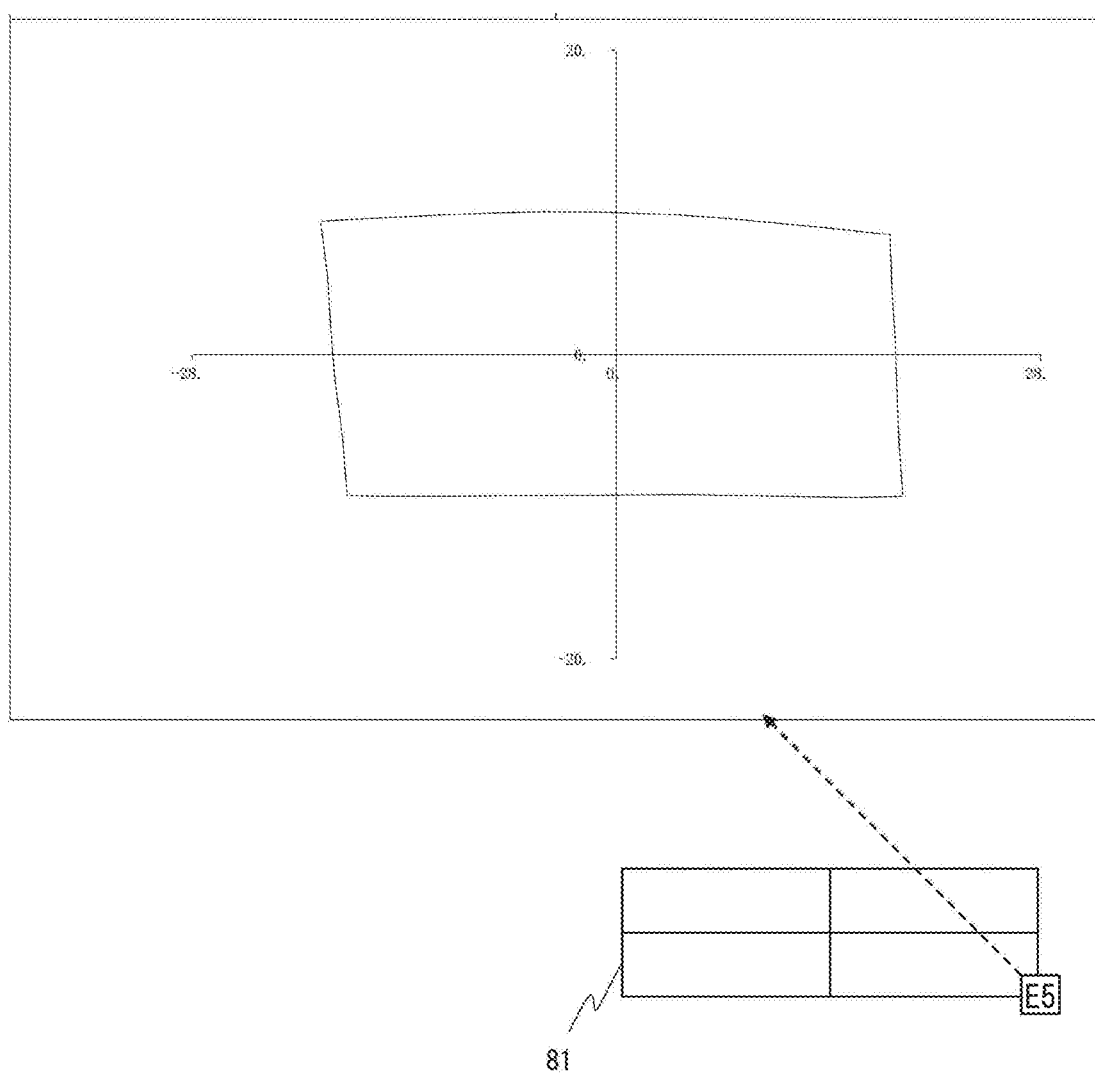
FIG. 9 is a view which shows distortion performance as seen from the right lower side of the eye-box according to the first embodiment.

FIG. 5 is a distortion view due to light rays passing through the center (E1) of the eye-box 8 on the liquid crystal display panel 22. FIG. 6 is a distortion view due to light rays passing through the rightmost upper corner (E2) of the eye-box 8 on the liquid crystal display panel 22. FIG. 7 is a distortion view due to light rays passing through the leftmost upper corner (E3) of the eye-box 8 on the liquid crystal display panel 22. FIG. 8 is a distortion view due to light rays passing through the leftmost lower corner (E4) of the eye-box 8 on the liquid crystal display panel 22. FIG. 9 is a distortion view due to light rays passing through the rightmost lower corner (E5) of the eye-box 8 on the liquid crystal display panel 22.

As mentioned above, the distortion performance shown in FIGS. 5 to 9 is a distortion performance on the liquid crystal display panel 22 due to light rays passing through the center and four corners of the eye-box 8 for the range of the rectangular virtual image plane 7. If the eye 9 is placed at each position in the eye-box S with a rectangular image displayed on the liquid crystal display panel 22, a distortion opposite to the distortion shown in FIGS. 5 to 9 (example: barrel type from/to reel type) is viewed. The distortion views shown in FIGS. 5 to 9 are almost the same in shape, so in the HUD 100 according to this embodiment, for example, if an image matched to the distortion view in FIG. 5 is displayed on the liquid crystal display panel 22, the viewer can view a rectangular virtual image without distortion.

FIG. 10 is a spot view on the liquid crystal display panel 22 when an object point is put on the virtual image plane 7 and is a view which shows spots in which the wavelength of the luminous flux passing through the entire eye-box 8 is 650 nm (red). FIG. 11 is a spot view on the liquid crystal display panel 22 when an object point is put on the virtual image plane 7 and is a view which shows spots in which the wavelength of the luminous flux passing through the entire eye-box 8 is 550 nm (green). FIG. 12 is a spot view on the liquid crystal display panel 22 when an object point is put on the virtual image plane 7 and is a view which shows spots in which the wavelength of the luminous flux passing through the entire eye-box 8 is 450 nm (blue).

The spot views shown in FIGS. 10 to 12 are spot views due to the total luminous flux in which the size of the eye-box 8 is 130 mm (horizontal) by 40 mm (vertical). In the case of a virtual image seen by an actual viewer, the spot view in the iris size of the eye 9 (said to be 7 mm in diameter at a maximum) is substantially improved.

Therefore, the HUD 100 according to the first embodiment can be compact due to the projection optical system 10 which uses the free-form surface concave mirror 52 and free-form surface lens 51.

Second Embodiment

Next, another embodiment of the projection optical system according to the present invention will be described referring to FIG. 20. This embodiment (second embodiment) has a feature in the aspect which is different from the image forming unit 20 in the first embodiment already described.

The projection optical system 10 according to the first embodiment is structured so that the image information generated on the liquid crystal display panel 22 is directly enlarged and projected by the ocular optical system 5 and displayed as a virtual image. On the other hand, a projection optical system 10a according to the second embodiment uses a smaller liquid crystal display panel 22a in an image forming unit 20a. The image information generated on the liquid crystal display panel 22a is enlarged and mapped on a screen plate 25 as a diffusing plate in a relay optical system 24. The image information enlarged and mapped on the screen plate 25 is enlarged and projected by the ocular optical system 5 and displayed as a virtual image.

More specifically, the luminous flux radiated from a backlight 23a on the liquid crystal display panel 22a, as an image luminous flux containing the image information displayed on the liquid crystal display panel 22a, enters the relay optical system 24. The image information from the liquid crystal display panel 22a is enlarged and projected on the screen plate 25 by the imaging effect of the relay optical system 24.

Figure 20:
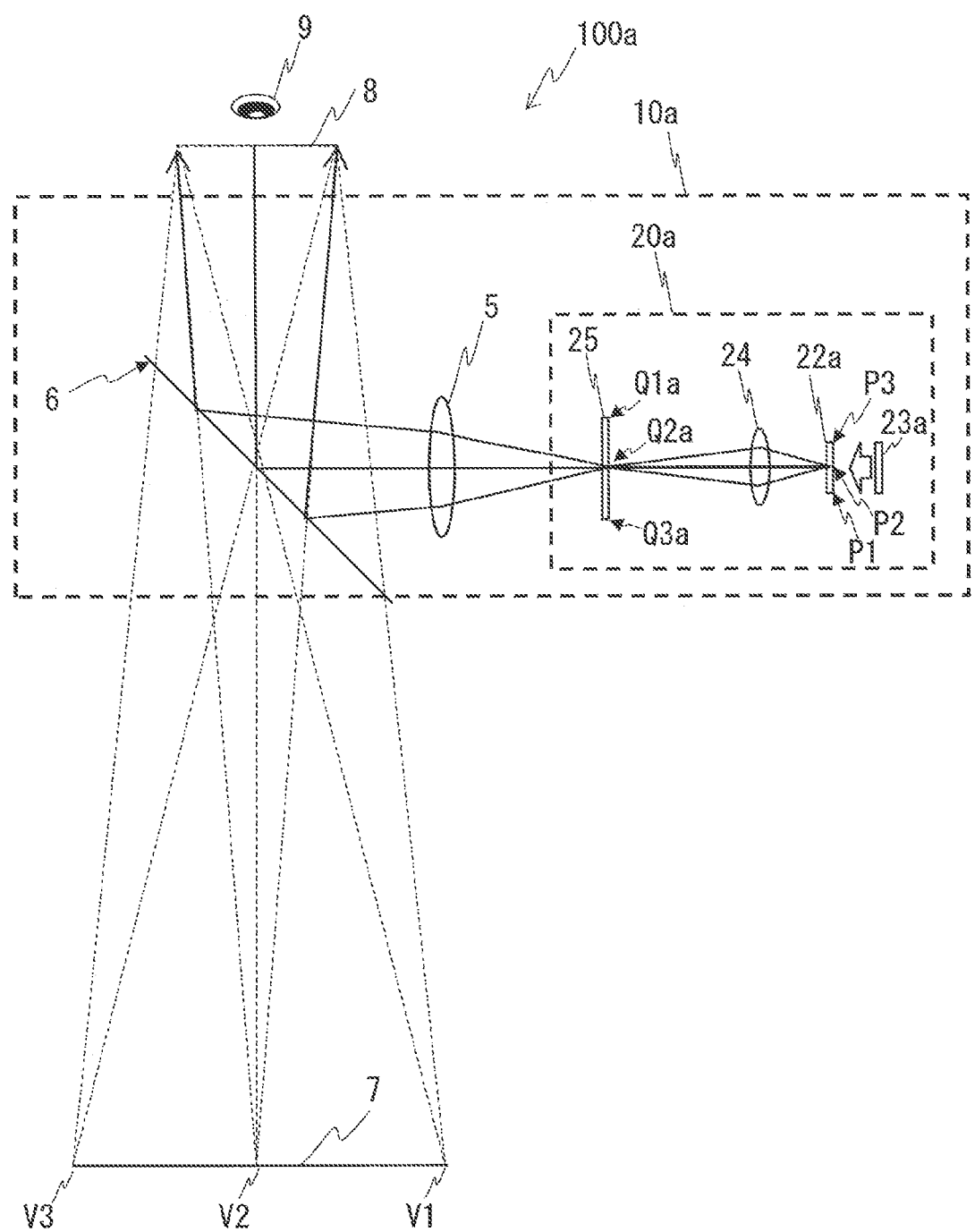
FIG. 20 is a general structure diagram which shows the head-up display device according to the second embodiment of the Present invention.

As shown in FIG. 20, points P1, P2, and P3 on the image luminous flux emitting plane of the liquid crystal display panel 22a are taken as virtual points. The virtual points on the screen plate 25 which correspond to the image luminous flux emitted from these virtual points are expressed as points Q1a, Q2a, and Q3a.

By using the relay optical system 24 according to this embodiment in the image forming unit 20a, the liquid crystal display panel 22a with a small display size can be used. In addition, the screen plate 25 includes a micro lens array in which micro lenses are arranged two-dimensionally. This produces a diffusion effect and increases the spread angle of the luminous flux emitted from the screen plate 25 and makes the size of the eye-box 8 a prescribed size. The diffusion effect of the screen plate 25 can also be achieved by built-in diffusing particles.

As explained above, the projection optical system 10a provided with the image forming unit 20a according to this embodiment can project enlarged image information even through the use of the small liquid crystal display panel 22a.

Third Embodiment

Figure 21:
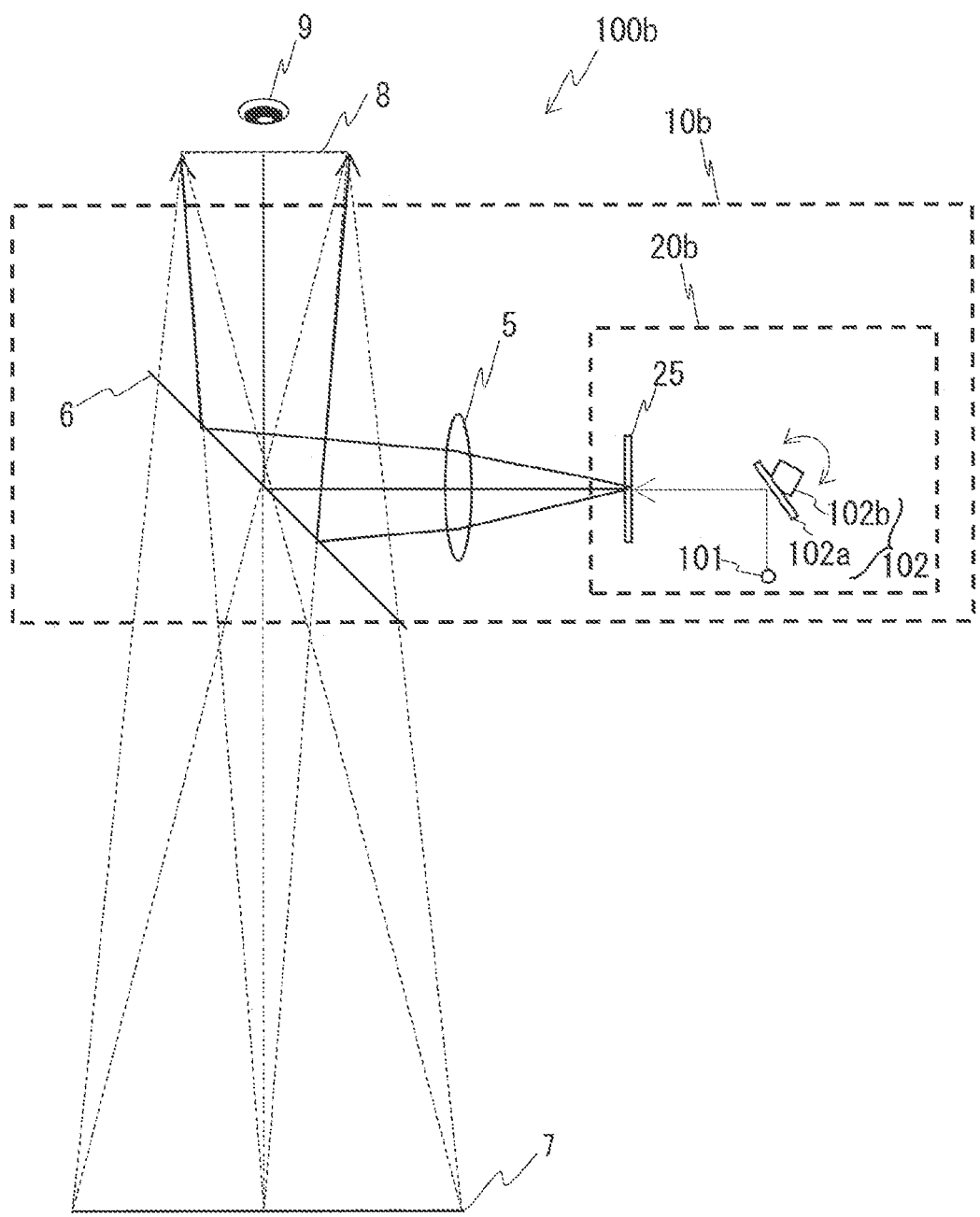
FIG. 21 is a general structure diagram which shows the head-up display device according to the third embodiment of the present invention.

Next, another embodiment of the projection optical system according to the present invention will be described referring to FIG. 21. This embodiment (third embodiment) has a feature in the aspect which is different from the projection optical system 10 in the second embodiment already described.

The projection optical system 10a according to the second embodiment maps the image information generated on the liquid crystal display panel 22a on the screen plate 25 with a diffusion function. On the other hand, a projection optical system 10b according to the third embodiment is structured to optical-scan the laser light from a laser light source 101 using MEMS (Micro Electro Mechanical Systems) 102.

The laser light source 101 is a light source which supplies light as the base for an image luminous flux. MEMS 102 includes a micro mirror 102a and a drive part 102b. The micro mirror 102a reflects the laser light emitted from the laser light source 101 and scans the screen plate 25 with laser light. The drive part 102b controls the reflection angle of the micro mirror 102a.

The screen plate 25 scanned by MEMS 102 has a diffusion function and emits the image information generated by scanning with laser light, toward the ocular optical system S.

As explained above, the projection optical system 10b provided with an image forming unit 20b according to this embodiment can project enlarged image information even through the use of laser light from the laser light source 101.

REFERENCE SIGNS LIST

1 . . . backlight,
2 . . . liquid crystal display panel,
3 . . . relay optical system,
4 . . . screen plate (diffusing plate),
5 . . . ocular optical system,
6 . . . windshield,
7 . . . virtual image plane,
8 . . . eye-box,
9 . . . eye of the viewer,
10 . . . projection optical system,
20 . . . image forming unit,
51 . . . free-form surface lens,
52 . . . free-form surface concave mirror,
100 . . . head-up display device

The invention claimed is:

1. A projection optical system including an ocular optical system to reflect light emitted from an image forming unit for generating image information and project the light on a windshield to display a virtual image,
wherein the ocular optical system includes a free-form surface lens and a free-form surface concave mirror in order from the image forming unit, and
if a horizontal direction of an eye-box is defined as X axis, a vertical axis is defined as Y axis, and a direction perpendicular to an XY plane is defined as Z axis,
when, as for a luminous flux corresponding to a view-point as an arbitrary point in a field of view, a curvature radius (positive value) of a circle determined by three points as projections on a YZ plane of intersections of three light rays passing through two points, an upper and a lower point, and a center point on the Y axis of the eye-box on the free-form surface concave mirror is expressed as RY4 and a curvature radius (positive value) of a circle determined by three points as projections on an XZ plane of intersections of three light rays passing through two points, a left and a right point, and a center point on the X axis of the eye-box on the free-form surface concave mirror is expressed as RX4, RX4>RY4 is satisfied.

2. The projection optical system according to claim 1, wherein the view-point at which the RY4 in the free-form surface concave mirror is maximum and the view-point at which the RY4 is minimum are separated left and right in the field of view.

3. The projection optical system according to claim 2, wherein, when a center position of a central luminous flux in the field of view in the free-form surface concave mirror is expressed as ADX4 on an X axis of a coordinate system defining the free-form surface concave mirror and expressed as ADY4 on a Y axis of the coordinate system defining the free-form surface concave mirror,
a center position of an effective luminous flux range on the free-form surface concave mirror holds a relation of |ADX4|>|ADY4|.

4. The projection optical system according to claim 3, wherein a long side direction of the effective luminous flux range on the free-form surface concave mirror is inclined with respect to the X axis of the coordinate system defining the free-form surface concave mirror and the inclination is equal to or bigger than 45 degrees.

5. The projection optical system according to claim 4, wherein the effective luminous flux range on the free-form surface concave mirror does not include a position in the free-form surface concave mirror corresponding to an origin of the coordinate system defining a free-form surface of the free-form surface concave mirror.

6. The projection optical system according to claim 5, wherein when, among intersections on the windshield of a luminous flux corresponding to each of the view-points, a positive curvature radius of a circle determined by three arbitrary points projected on a YZ plane is expressed as RY2 and a positive curvature radius of a circle determined by the three arbitrary points projected on an XZ plane is expressed as RX2, RX2<RY2 is satisfied.

7. The projection optical system according to claim 6, wherein a view-point at which the RX2 in the windshield is maximum and a view-point at which the RX2 is minimum are separated left and right in the field of view.

8. The projection optical system according to claim 6, wherein, when a center position of a central luminous flux in the field of view in the windshield is expressed as ADX2 on an X axis of a coordinate system defining the windshield and expressed as ADX4 on the X axis of the coordinate system defining the free-form surface concave mirror,
the ADX2 and the ADX4 have opposite signs.

9. A head-up display device comprising:
an image forming unit to emit light containing image information; and
an ocular optical system to reflect light emitted from the image forming unit and project the light on a windshield to display a virtual image,
wherein the ocular optical system includes a free-form surface lens and a free-form surface concave mirror in order from the image forming unit, and if a horizontal direction of an eye-box is defined as X axis, a vertical axis is defined as Y axis, and a direction perpendicular to an XY plane is defined as Z axis, when, among intersections on the free-form surface concave mirror of a luminous flux corresponding to a view-point as an arbitrary point in a field of view, a positive curvature radius of a circle determined by three arbitrary points projected on a YZ plane is expressed as RY1 and a positive curvature radius of a circle determined by three arbitrary points projected on an XZ plane is expressed as RX1, RX1>RY1 is satisfied.

10. The head-up display device according to claim 9, wherein the view-point at which the RY1 in the free-form surface concave mirror is maximum and the view-point at which the RY1 is minimum are separated left and right in the field of view.

11. The head-up display device according to claim 10, wherein, when a center position of a central luminous flux in the field of view in the free-form surface concave mirror is expressed as ADX4 on an X axis of a coordinate system defining the free-form surface concave mirror and expressed as ADY4 on a Y axis of the coordinate system defining the free-form surface concave mirror, a center position of an effective luminous flux range on the free-form surface concave mirror holds a relation of |ADX4|>|ADY4|.

12. The head-up display device according to claim 11, wherein a long side direction of an effective luminous flux range on the free-form surface concave mirror is inclined with respect to the X axis of the coordinate system defining the free-form surface concave mirror and the inclination is equal to or bigger than 45 degrees.

13. The head-up display device according to claim 12, wherein an effective luminous flux range on the free-form surface concave mirror does not include an origin of the free-form surface concave mirror in the coordinate system defining the free-form surface concave mirror.

14. The head-up display device according to claim 13, wherein when, among intersections on the windshield of a luminous flux corresponding to each of the view-points, a positive curvature radius of a circle determined by three arbitrary points projected on the YZ plane is expressed as RY2 and a positive curvature radius of a circle determined by the three arbitrary points projected on the XZ plane is expressed as RX2, RX2<RY2 is satisfied.

15. The head-up display device according to claim 14, wherein a view-point at which the RX2 in the windshield is maximum and a view-point at which the RX2 is minimum are separated left and right in the field of view.

16. The head-up display device according to claim 14, wherein when a center position of a central luminous flux in the field of view in the windshield is expressed as ADX2 on an X axis of a coordinate system defining the windshield and expressed as ADX4 on the X axis of the coordinate system defining the free-form surface concave mirror, the ADX2 and the ADX4 have opposite signs.

17. A vehicle with a windshield located frontward, comprising a head-up display device including:
an image forming unit to emit light containing image information; and
an ocular optical system to reflect light emitted from the image forming unit and project the light on the windshield to display a virtual image, the ocular optical system including a free-form surface lens and a free-form surface concave mirror in order from the image forming unit, wherein the head-up display device is the head-up display device according to claim 9.

* * * * *